(12) United States Patent
Cuttell et al.

(10) Patent No.: US 12,254,479 B2
(45) Date of Patent: *Mar. 18, 2025

(54) DETERMINING PROPENSITIES TO DRIVE WEBSITE TARGET USER ACTIVITY

(71) Applicant: State Farm Mutual Automobile Insurance Company, Bloomington, IL (US)

(72) Inventors: Matthew Cuttell, Cumming, GA (US); Shuhui Zheng, Atlanta, GA (US); Carl Baldone, Dunwoody, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,360

(22) Filed: Oct. 20, 2023

(65) Prior Publication Data

US 2024/0046291 A1 Feb. 8, 2024

Related U.S. Application Data

(63) Continuation of application No. 17/887,031, filed on Aug. 12, 2022, now Pat. No. 11,836,749, which is a
(Continued)

(51) Int. Cl.
*G06Q 30/0203* (2023.01)
*G06F 16/9535* (2019.01)
(Continued)

(52) U.S. Cl.
CPC ..... *G06Q 30/0203* (2013.01); *G06F 16/9535* (2019.01); *G06F 16/955* (2019.01);
(Continued)

(58) Field of Classification Search
CPC .. G06F 16/9535; G06F 16/955; G06F 16/958; G06F 16/972; G06F 21/567;
(Continued)

(56) References Cited

U.S. PATENT DOCUMENTS

2007/0033104 A1* 2/2007 Collins .............. G06Q 30/0251
705/14.41
2010/0042476 A1* 2/2010 Gauri ................. G06Q 30/0601
705/7.29
(Continued)

OTHER PUBLICATIONS

Office Action for U.S. Appl. No. 17/887,031, mailed on Apr. 12, 2023, Cuttell, "Determining Propensities to Drive Website Target User Activity", 5 pages.
(Continued)

*Primary Examiner* — Le H Luu
(74) *Attorney, Agent, or Firm* — Lee & Hayes, P.C.

(57) ABSTRACT

Users may engage in a target user activity via digital systems, such as a website, and/or non-digital systems. Users may user various digital channels to arrive at the digital systems or non-digital systems. Users may also arrive at digital systems, such as the website, via different entry pages. A propensity analyzer can, based on activity data associated with users, determine propensities of one or more of the digital channels, digital systems, non-digital channels, and/or entry pages to drive users to perform a target user activity. The propensity analyzer can generate recommendations for revising digital channels, digital systems, non-digital channels, and/or entry pages to increase their propensities to drive users to perform the target user activity.

20 Claims, 15 Drawing Sheets

Related U.S. Application Data continuation-in-part of application No. 17/369,752, filed on Jul. 7, 2021, now Pat. No. 11,449,572, which is a continuation of application No. 17/127,110, filed on Dec. 18, 2020, now Pat. No. 11,086,964.

(60) Provisional application No. 62/953,021, filed on Dec. 23, 2019.

(51) Int. Cl.
| | | |
|---|---|---|
| *G06F 16/955* | (2019.01) | |
| *G06F 16/958* | (2019.01) | |
| *G06N 5/04* | (2023.01) | |
| *G06N 20/00* | (2019.01) | |
| *H04L 67/50* | (2022.01) | |

(52) U.S. Cl.
CPC ............. *G06F 16/958* (2019.01); *G06N 5/04* (2013.01); *G06N 20/00* (2019.01); *H04L 67/535* (2022.05)

(58) Field of Classification Search
CPC ...... G06N 5/04; G06N 20/00; G06Q 30/0203; G06Q 30/0251; G06Q 30/0601; G06Q 10/02; G06Q 50/01; H04L 67/535; H04L 43/062; H04L 51/214; H04L 51/52
See application file for complete search history.

(56) References Cited

U.S. PATENT DOCUMENTS

| | | | |
|---|---|---|---|
| 2013/0013778 A1* | 1/2013 | Herde | G06Q 10/02 709/225 |
| 2013/0138503 A1* | 5/2013 | Brown | G06Q 30/0203 705/14.45 |
| 2014/0331119 A1* | 11/2014 | Dixon | G06F 21/567 715/234 |
| 2015/0363831 A1* | 12/2015 | Friborg, Jr. | H04L 51/214 705/14.55 |
| 2017/0063653 A1* | 3/2017 | Kieviet | H04L 43/062 |
| 2017/0070458 A1* | 3/2017 | Kunieda | G06Q 50/01 |
| 2018/0246983 A1* | 8/2018 | Rathod | G06F 16/972 |
| 2019/0087747 A1* | 3/2019 | Kapoor | H04L 51/52 |
| 2021/0334324 A1 | 10/2021 | Cuttell et al. | |
| 2022/0405782 A1 | 12/2022 | Cuttell | |

OTHER PUBLICATIONS

Office Action for U.S. Appl. No. 17/369,752, mailed on Feb. 17, 2022, Cuttell, "Determining Propensities to Drive Website Target User Activity", 5 Pages.

* cited by examiner

|  | Analysis of Maximum Likelihood Estimates | | | | | Odds Ratio Estimates | | |
|---|---|---|---|---|---|---|---|---|
|  | DF | Estimate | Standard Error | Wald Chi-Square | Pr > ChiSq | Point Estimate | 95% Wald Confidence Limits | |
| Intercept | 1 | -2.1775 | 0.00284 | 589580.233 | <.0001 | | | |
| 502A | 1 | -0.0996 | 0.00486 | 419.7239 | <.0001 | 0.905 | 0.897 | 0.914 |
| 502B | 1 | -0.0807 | 0.00684 | 139.3338 | <.0001 | 0.922 | 0.910 | 0.935 |
| 502C | 1 | 0.2812 | 0.00247 | 13000.6917 | <.0001 | 1.325 | 1.318 | 1.331 |
| 502D | 1 | 0.7713 | 0.00299 | 66599.4028 | <.0001 | 2.163 | 2.150 | 2.175 |
| 502E | 1 | -1.1205 | 0.0166 | 4536.9279 | <.0001 | 0.326 | 0.316 | 0.337 |
| 502F | 1 | 0.0884 | 0.00687 | 465.5432 | <.0001 | 1.092 | 1.078 | 1.107 |
| 502G | 1 | 0.3574 | 0.0926 | 14.8946 | 0.0001 | 1.430 | 1.192 | 1.714 |
| 502H | 1 | 0.0915 | 0.00038 | 57713.2315 | <.0001 | 1.096 | 1.095 | 1.097 |
| Device | 1 | -0.0464 | 0.00323 | 206.2592 | <.0001 | 0.955 | 0.949 | 0.961 |

| First Digital Channel | | | | | | | |
|---|---|---|---|---|---|---|---|
| Analysis of Maximum Likelihood Estimates | | | | | Odds Ratio Estimates | | |
| | DF | Estimate | Standard Error | Wald Chi-Square | Pr > ChiSq | Point Estimate | 95% Wald Confidence Limits | |
| Intercept | 1 | -2.9862 | 0.00718 | 173031.120 | <.0001 | | | |
| 802A | 1 | -6.1356 | 0.1160 | 2795.3017 | <.0001 | 0.002 | 0.002 | 0.003 |
| 802B | 1 | 0.6652 | 0.00646 | 10606.4210 | <.0001 | 1.945 | 1.920 | 1.970 |
| 802C | 1 | 0.5090 | 0.00746 | 4654.3386 | <.0001 | 1.664 | 1.639 | 1.688 |
| 802D | 1 | -0.4011 | 0.00701 | 3271.2829 | <.0001 | 0.670 | 0.660 | 0.679 |
| 802E | 1 | -0.1606 | 0.0214 | 56.1665 | <.0001 | 0.852 | 0.817 | 0.888 |
| 802F | 1 | -0.7028 | 0.0179 | 1541.4518 | <.0001 | 0.495 | 0.478 | 0.513 |
| 802G | 1 | -0.1685 | 0.0820 | 4.2209 | 0.0399 | 0.845 | 0.719 | 0.992 |
| 802H | 1 | -1.1516 | 0.0194 | 3517.4160 | <.0001 | 0.316 | 0.304 | 0.328 |
| 802I | 1 | -0.7740 | 0.0545 | 186.4549 | <.0001 | 0.475 | 0.427 | 0.529 |
| 802J | 1 | -0.2115 | 0.0204 | 107.8108 | <.0001 | 0.809 | 0.778 | 0.842 |
| 802K | 1 | 0.7393 | 0.00920 | 6460.8748 | <.0001 | 2.094 | 2.057 | 2.133 |
| 802L | 1 | 0.8733 | 0.00251 | 121198.707 | <.0001 | 2.395 | 2.383 | 2.407 |
| 802M | 1 | -1.0204 | 0.0651 | 245.4519 | <.0001 | 0.360 | 0.317 | 0.410 |
| 802N | 1 | 0.2741 | 0.0187 | 215.1034 | <.0001 | 1.315 | 1.268 | 1.364 |

| | | | | | | | |
|---|---|---|---|---|---|---|---|
| | Second Digital Channel | | | | | | |
| | Analysis of Maximum Likelihood Estimates | | | | | Odds Ratio Estimates | |
| | DF | Estimate | Standard Error | Wald Chi-Square | Pr > ChiSq | Point Estimate | 95% Wald Confidence Limits |
| Intercept | 1 | -1.9403 | 0.00904 | 46035.2072 | <.0001 | | |
| 802A | 1 | -5.4272 | 0.1114 | 2373.5298 | <.0001 | 0.004 | 0.004 0.005 |
| 802B | 1 | 0.2299 | 0.00978 | 552.7767 | <.0001 | 1.258 | 1.235 1.283 |
| 802C | 1 | 0.0802 | 0.00900 | 79.4545 | <.0001 | 1.084 | 1.065 1.103 |
| 802D | 1 | -0.2637 | 0.00769 | 1176.9118 | <.0001 | 0.768 | 0.757 0.780 |
| 802E | 1 | -0.2468 | 0.0314 | 61.8889 | <.0001 | 0.781 | 0.735 0.831 |
| 802F | 1 | -0.5863 | 0.0203 | 835.7496 | <.0001 | 0.556 | 0.535 0.579 |
| 802G | 1 | -0.6322 | 0.0697 | 82.2432 | <.0001 | 0.531 | 0.464 0.609 |
| 802H | 1 | -0.7217 | 0.0239 | 909.9867 | <.0001 | 0.486 | 0.464 0.509 |
| 802I | 1 | -0.5872 | 0.0561 | 109.3971 | <.0001 | 0.556 | 0.498 0.621 |
| 802J | 1 | -0.3709 | 0.0366 | 102.5620 | <.0001 | 0.690 | 0.642 0.741 |
| 802K | 1 | 0.1699 | 0.0103 | 273.2652 | <.0001 | 1.185 | 1.162 1.209 |
| 802L | 1 | 0.7222 | 0.00264 | 74655.1316 | <.0001 | 2.059 | 2.048 2.070 |
| 802M | 1 | -0.5356 | 0.1117 | 22.9893 | <.0001 | 0.585 | 0.470 0.729 |
| 802N | 1 | 0.1546 | 0.0225 | 47.3866 | <.0001 | 1.167 | 1.117 1.220 |

__US 12,254,479 B2__

DETERMINING PROPENSITIES TO DRIVE WEBSITE TARGET USER ACTIVITY

RELATED APPLICATIONS

This U.S. patent application is a continuation of and claims priority to U.S. patent application Ser. No. 17/887,031, filed on Aug. 12, 2022, which is a continuation-in-part of, and claims priority to, U.S. patent application Ser. No. 17/369,752, filed on Jul. 7, 2021, entitled "DETERMINING PROPENSITIES TO DRIVE WEBSITE TARGET USER ACTIVITY," which is a continuation of, and claims priority to, U.S. patent application Ser. No. 17/127,110, filed on Dec. 18, 2020, entitled "DETERMINING PROPENSITIES TO DRIVE WEBSITE TARGET USER ACTIVITY," which claims priority to provisional U.S. Patent Application No. 62/953,021, entitled "Propensity of Target User Conversion Activity Based on Digital Channels," filed on Dec. 23, 2019, the disclosures of which are incorporated herein by reference in their entirety.

TECHNICAL FIELD

The present disclosure relates to analyzing activity data associated with digital systems, such as a website, and/or non-digital systems, and more particularly to determining propensities of elements of the digital systems, and/or the non-digital systems, to drive users to engage in a target user activity.

BACKGROUND

Users can arrive at a website through a variety of digital channels. For example, a user may load the website by directly typing a Uniform Resource Locator (URL) for the website into a web browser. In other examples, users may load the website by clicking on paid advertisements or organic search results in search engines, clicking on banner advertisements displayed on other websites, or loading the website via other types of digital channels. Such digital channels can cause users to arrive at various entry pages of the website, such as a homepage of the website or other web pages that are focused on certain products or services.

An operator of a website may want users to perform a particular target user activity during visits to the website. As an example, an operator of an insurance website may want users to perform a target user activity of initiating a new insurance quote via the website. As another example, an operator of a website for a streaming video service may want users to perform a target user activity of signing up for a streaming video account via the website.

Some digital channels may be more successful than other digital channels at driving users to perform a target user activity during visits to a website. Similarly, some types of entry pages may be more successful than other types of entry pages at driving users to perform a target user activity on a website. However, it can be difficult to determine the propensities of different digital channels, and/or different types of entry pages, to drive users to perform the target user activity. Accordingly, it can also be difficult to identify opportunities to revise web pages and/or digital channels based on their respective propensities to drive the target user activity, or to determine how to revise such web pages and/or digital channels to increase their propensities to drive the target user activity. It can similarly be difficult to determine how to prioritize resources associated with web pages or digital channels, based on their respective propensities to drive the target user activity.

Some users may also be more likely to engage in the target user activity via non-digital systems, such as phone calls or in-person meetings, relative to the likelihood of such users engaging in the target user activity via the website or other digital systems. However, it can be difficult to identity which users may be more likely to engage in the target user activity via non-digital systems relative to digital systems, and thus which type of system to recommend for use with respect to individual users.

The example systems and methods described herein may be directed toward mitigating or overcoming one or more of the deficiencies described above.

SUMMARY

Described herein are systems and methods that can determine propensities of one or more digital channels, one or more digital systems, such as a website, one or more groups of entry pages of the website, and/or one or more non-digital systems, to drive users to perform a target user activity. The target user activity may be a specific activity that an operator of the website, other digital systems, and/or the non-digital systems wants to drive users to perform. The systems and methods described herein can use activity data to determine relative propensities of digital channels, entry pages, digital systems, and/or non-digital systems to drive the target user activity. In some examples, the systems and methods described herein can also, based on the determined propensities, recommend changes to digital channels, entry pages, digital systems, and/or non-digital systems that are predicted to increase respective propensities to drive the target user activity.

According to a first aspect, a method can include receiving, by one or more processors, activity data indicative of use of a set of user paths by users. Individual user paths, of the set of user paths, can include one or more digital channels, one or more digital systems, and/or one or more non-digital systems. The method can also include identifying, by the one or more processors and based on the activity data, instances of a target user activity occurring in association with the individual user paths. The method can further include determining, by the one or more processors and based on the activity data, respective propensities of the individual user paths to drive the target user activity. The method can also include determining, by the one or more processors and based on the respective propensities, that a first propensity of a first user path to drive the target user activity is lower than a second propensity of a second user path to drive the target user activity. The first user path can have a first attribute, and the second user path can have a second attribute different than the first attribute. The method can additionally include, based on determining that the first propensity is lower than the second propensity, revising, by the one or more processors, the first user path based on the second attribute of the second user path.

According to a second aspect, one or more computing device can include one or more processors and memory storing computer-executable instructions that, when executed by the one or more processors, cause the one or more computing devices to perform operations. The operations can include receiving activity data indicative of use of a set of user paths by users. Individual user paths, of the set of user paths, can include one or more digital channels, one or more digital systems, and/or one or more non-digital systems. The operations can also include identifying, based on the activity data, instances of a target user activity occurring in association with the individual user paths. The operations can further include determining, based on the activity data, respective propensities of the individual user paths to drive the target user activity. The operations can also include determining, based on the respective propensities, that a first propensity of a first user path to drive the target user activity is lower than a second propensity of a second user path to drive the target user activity. The first user path can have a first attribute, and the second user path can have a second attribute different from the first attribute. The operations can additionally include, based on based on determining that the first propensity is lower than the second propensity, revising the first user path based on the second attribute of the second user path.

According to a third aspect, one or more non-transitory computer-readable media can store computer-executable instructions that, when executed by one or more processors, cause the one or more processors to perform operations. The operations can include receiving activity data indicative of use of a set of user paths by users. The activity data can indicate user classifications of the users. Individual user paths, of the set of user paths, can include one or more digital channels, one or more digital systems, and/or one or more non-digital systems. The operations can also include identifying, based on the activity data, instances of a target user activity occurring in association with the individual user paths and individual user classifications of the user classifications. The operations can additionally include determining, based on the activity data, propensities of the individual user paths to drive the target user activity, in association with the individual user classifications. The operations can further include determining a particular user classification associated with a particular user. The operations can additionally include selecting a particular user path, of the set of user paths, associated with a highest propensity, of the propensities, to drive the target user activity in association with the particular user classification. The operations can also include recommending usage of the particular user path in association with the particular user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
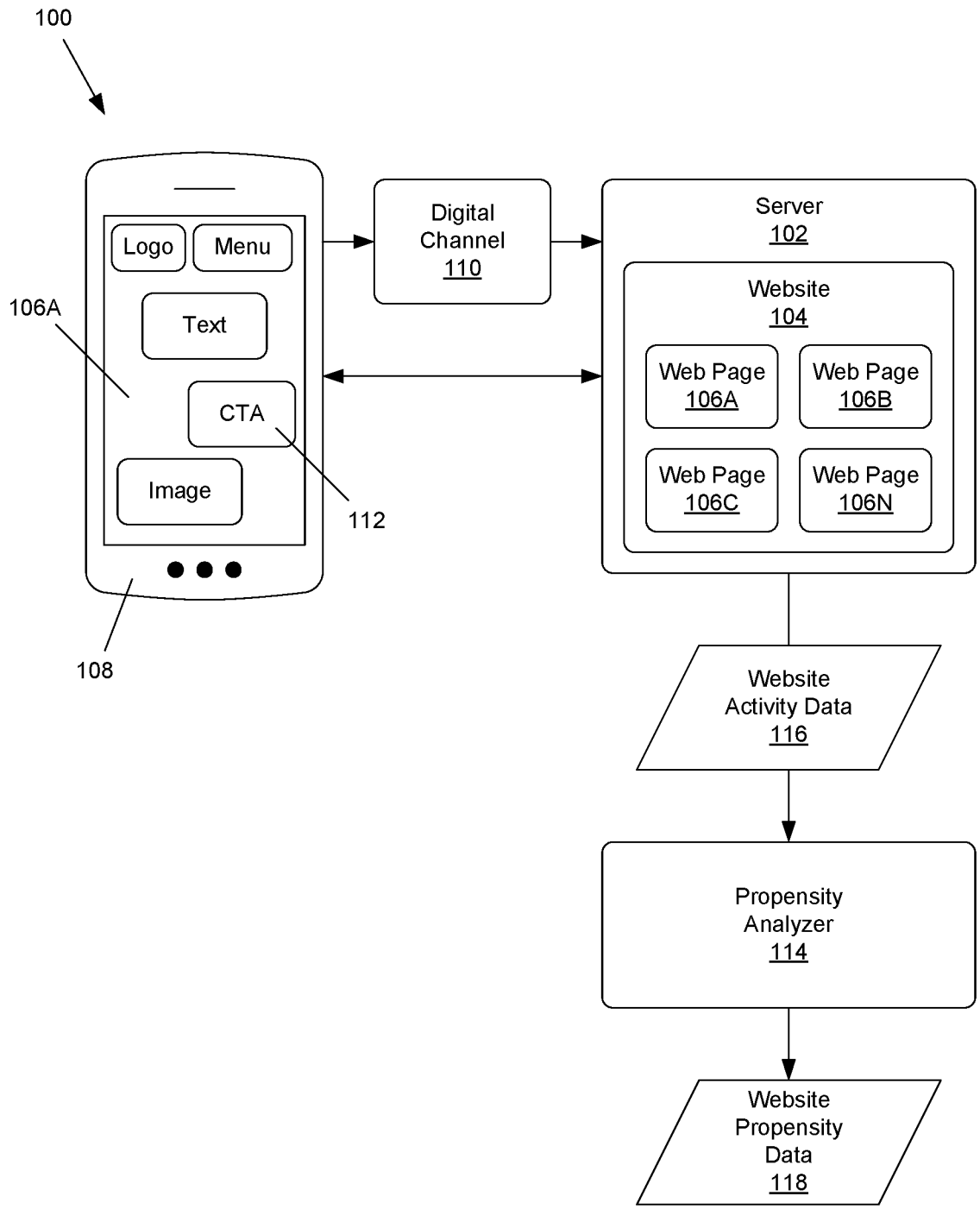
FIG. 1 shows a first example of a propensity analysis system.

FIG. 1 shows a first example 100 of a propensity analysis system. A server 102 can host a website 104 that includes a set of web pages 106, such as web pages 106A, 106B, ... 106N (wherein "N" represents any number of web pages greater than zero). The website 104 can include a variety of different web pages 106, and in some examples can include different categories or groups of web pages 106. The server 102 can be a computing device with memory that stores data associated with the web pages 106.

A user device 108 can use a network connection, such as an Internet connection, to exchange data with the server 102. As an example, the user device 108 can send a request for a web page to the server 102, and the server 102 can return data associated with the requested web page to the user device 108. Accordingly, the user device 108 can be configured to render and/or display the web pages 106 of the website 104, based on data received from the server 102. In some examples, the user device 108 can be a mobile phone, as shown in FIG. 1. However, in other examples, the user device 108 can be another type of computing device, such as a personal digital assistant (PDA), a media player, a tablet computer, a gaming device, a smart watch, a personal computer (PC) such as a laptop, desktop, or workstation, or any other type of computing or communication device. The server 102 can interact with multiple user devices, including user device 108, to serve web pages 106 of the website 104 to user devices associated with different users.

Figure 2:
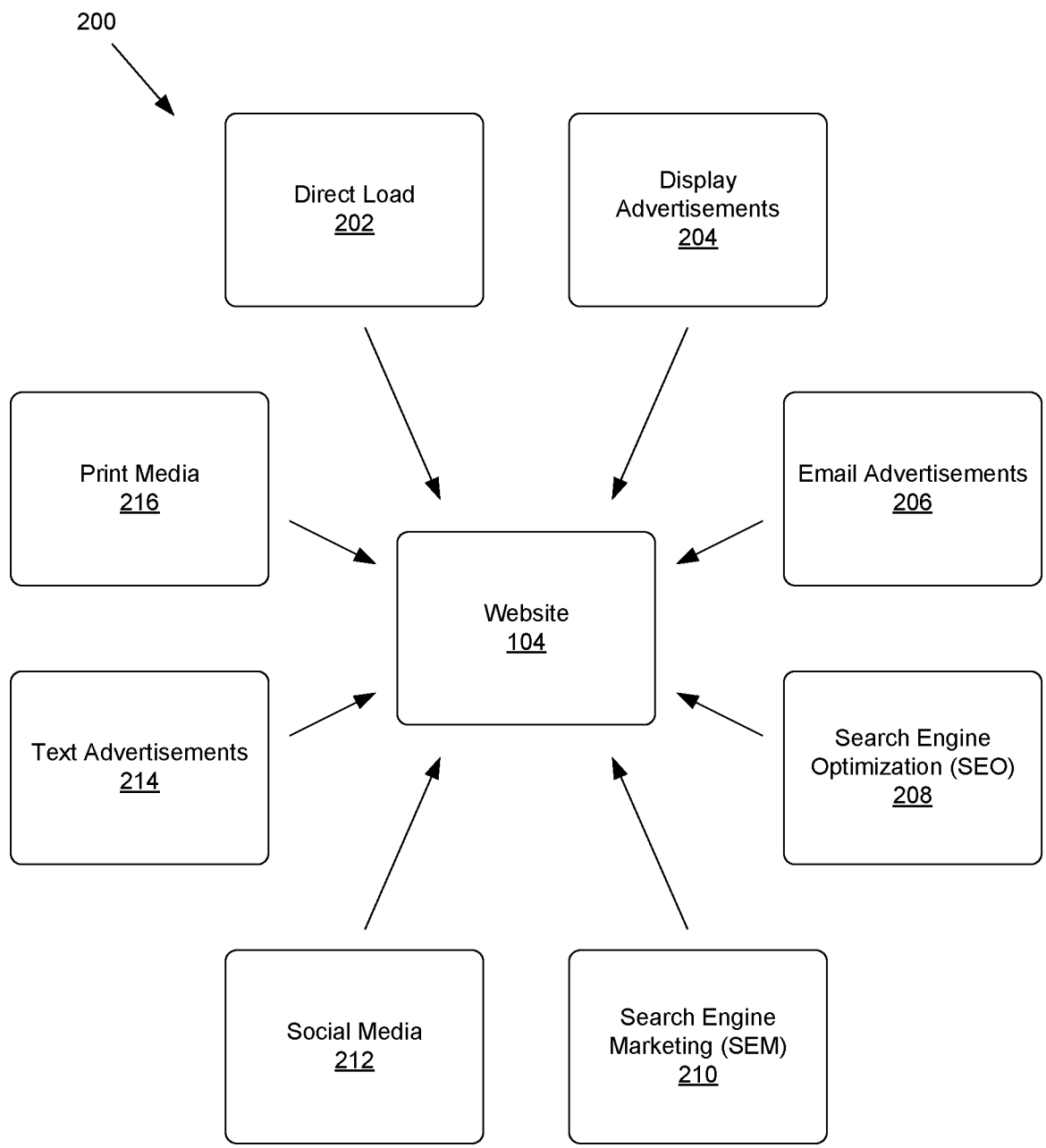
FIG. 2 shows an example of various digital channels that can drive user visits to a website.

The user device 108 may initially load the website 104 from the server 102 via a digital channel 110. A digital channel 110 can, for instance, be a referring channel by which the user device 108 arrives at the website 104. As an example, the digital channel 110 may be associated with a link to the website 104 that is displayed via a search engine, on a third-party website, on a social media platform, or any other platform. As another example, the digital channel 110 can be a direct user entry of a URL associated with the website 104 into a web browser on the user device 108. These and other examples of types of digital channels 110 are shown in FIG. 2, and are discussed in more detail below with respect to that figure.

Different web pages 106 of the website 104 may have different content. For example, the website 104 can have a homepage that serves as a broad introduction to the website 104. However, the website 104 can also have many other web pages 106 that are focused on narrower or more specific types of information. Different web pages 106 may include different text and/or images, be associated with different subjects, have different designs or layouts, and/or differ in other ways.

When the user device 108 accesses the website 104 via the server 102, the user device 108 may initially load the homepage of the website 104, or may instead bypass the homepage and directly load another web page 106 of the website 104. For example, when a user performs a search on a search engine, search results displayed via the search engine may include a link to a specific web page 106 within the overall website 104 that best matches search terms entered by the user. Accordingly, the user device 108 may use that link to access the website 104 by loading the specific linked web page 106, thereby bypassing the homepage of the website 104.

Figure 3:
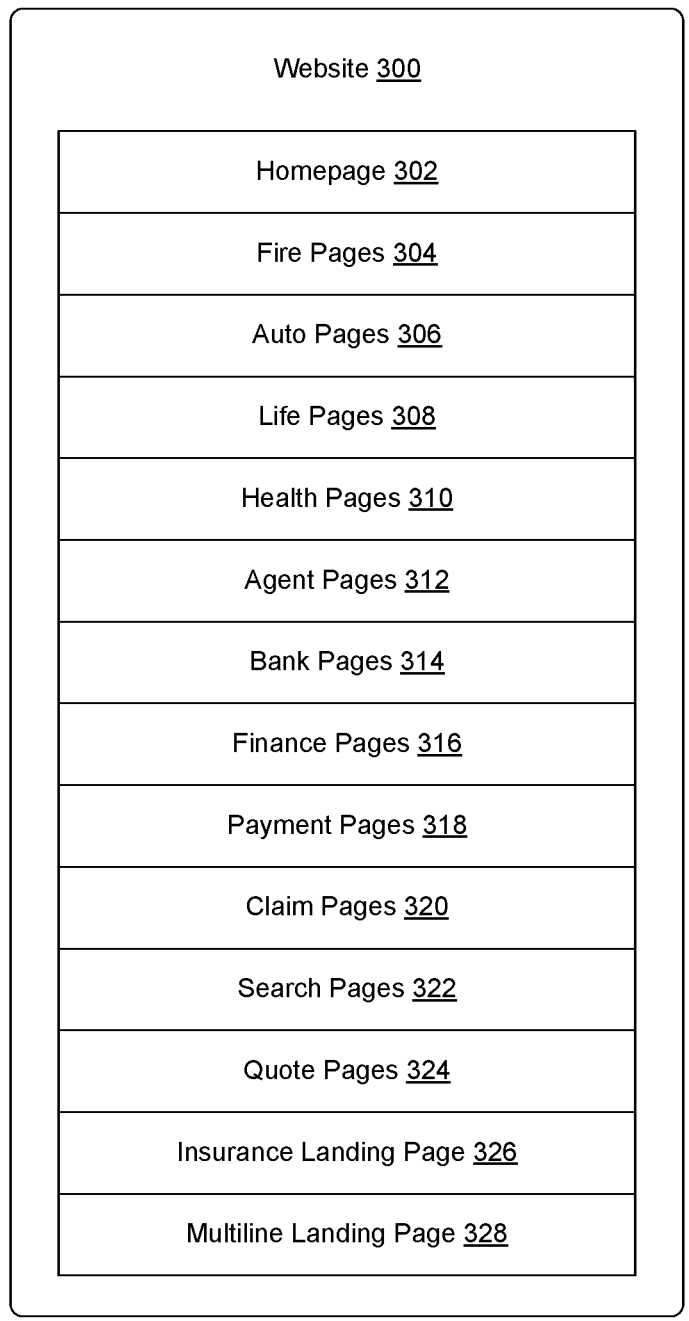
FIG. 3 shows an example of various groups of web pages of an example website.

The particular web page 106 that the user device 108 first uses to access the website 104 during a visit can be known as an "entry page" or "landing page" for that user device 108. After requesting and loading the entry page, the user device 108 may navigate to other web pages 106 of the website 104. For instance, after loading a particular entry page on the user device 108, a user of the user device 108 may click on a link displayed on the entry page to navigate to a different web page 106 of the website 104. An example of different types of web pages 106 associated with a website, any of which could be an entry page of the website for the user device 108, are shown in FIG. 3 and are described below with respect to that figure.

As will be discussed further below, the same and/or different digital channels may cause user devices to access different entry pages of the website 104. For example, if the digital channel 110 is associated with a search engine, the search engine may display links to either web page 106A or web page 106B depending on search terms entered into the search engine by the user. Accordingly, the same search engine may cause user devices to access different entry pages of the same website 104.

At least some of the web pages 106 can include a call to action (CTA) 112. A CTA 112 can include text, images, video, sounds, and/or other elements that can be presented via the user device 108 as part of a web page. The CTA 112 can be associated with a target user activity, such that a user can engage in the target user activity via the website 104 if the user selects or otherwise engages with at least a portion of the CTA 112. For instance, the CTA 112 can include a portion of text that explains the target user activity and/or attempts to persuade users to engage in the target user activity, as well as a button or other user interface element that, if selected by a user, initiates the target user activity.

As an example, the website 104 may be associated with an insurance company, and the target user activity may be a "quote start" in which a user initiates a process to receive a new insurance quote via the website 104. The insurance quote may be for automobile insurance, homeowner insurance, renter insurance, condominium insurance, life insurance, small business insurance, health insurance, disability insurance, pet insurance, or any other type of insurance offered via the website 104. In this example, the CTA 112 may include an image link or text link that reads "Start a Quote," or any other text, image, and/or other user interface element that, if selected or engaged with via user input, initiates a process by which the user can obtain an insurance quote via the website 104. For instance, if a user clicks on a "Start a Quote" link associated with the CTA 112, a web browser on the user device 108 may be redirected to a different web page 106 designed to accept user input about a home or automobile that the insurance company can use to generate a new insurance quote for the home or automobile.

In other examples, the target user activity may be any other type of user activity that users can engage in via the website 104. For instance, the CTA 112 may be associated with any other type of target user activity, such as paying a bill, performing a search for an insurance agent, initiating an insurance claim, performing a search for a product or service, purchasing a product or service, and/or performing any other desired user activity.

Multiple web pages 106 of the website 104 can include CTAs 112 associated with the same target user activity. However, different web pages 106 may include different types of CTAs 112 associated with the same target user activity. For example, different web pages 106 include different CTAs 112 that explain the same target user activity using different text, images, and/or other user interface elements.

Different web pages 106 may also display CTAs 112 associated with the same target user activity at different positions. For example, the CTA 112 may be displayed relatively close to the top of web page 106A, such that the CTA 112 is visible immediately when web page 106A first loads on the user device 108. However, the CTA 112 may be displayed at a lower position on web page 106B than on web page 106A. For instance, the CTA 112 may not be visible initially when web page 106B first loads on the user device 108, but may become visible on user device 108 once a user scrolls down web page 106B.

As shown in FIG. 1, the website 104 can be associated with a propensity analyzer 114. The propensity analyzer 114 can receive website activity data 116 that includes data associated with interactions between one or more user devices and the website 104. The propensity analyzer 114 can receive the website activity data 116 from the server 102, from a web analytics service such as Adobe® Analytics or Google® Analytics, and/or from any other source configured to monitor interactions between user devices and the website 104. In some examples, the propensity analyzer 114 can receive the website activity data 116 substantially in real time. In other examples, the propensity analyzer 114 can receive the website activity data 116 on a periodic or occasional basis, such as daily, weekly, or monthly.

The website activity data 116 may indicate which digital channels user devices used to access the website 104, which entry pages the user devices used to access the website 104, whether users associated with the user devices engaged in the target user activity, which web pages 106 the users used to initiate the target user activity, and/or other data about interactions between user devices and the website 104. As an example, whether or not a user engages in the target user activity during a visit to the website 104 may be tracked as a binary value, for instance by storing a value of "1" if the user performed the target user activity or by storing a value of "0" if the user did not perform the target user activity. In other examples, any other type of data can be used to express whether or not a user engages in the target user activity during a visit to the website 104.

In some examples, the website activity data 116 may use cookie information and/or other data to identify activity associated with different categories of users of the website 104. For example, if the website 104 is a website for a company, traffic to the website 104 may include both existing customers of the company as well as users who are not currently customers of the company. The target user activity may be "quote starts" or other activity that may lead non-customers to become customers. The website activity data 116 may separately indicate activity of customers and non-customers, or only include data about non-customers, such that the website activity data 116 can indicate whether the non-customers performed the target user activity during their visits to the website 104.

The propensity analyzer 114 can be configured to analyze the website activity data 116 and determine propensities of different web pages 106 and/or different digital channels to drive users to engage in the target user activity. A propensity can be considered a probability, chance, or likelihood that a user will perform the target user activity during a visit to the website 104.

The propensity analyzer 114 can use a statistical analysis to determine propensities associated with different web pages 106 and/or different digital channels to drive users to engage in the target user activity. The statistical analysis can be based on regression, linear regression, decision tree modeling, and/or other statistical analysis techniques. For example, the propensity analyzer 114 can use a logistic regression model that identifies variables that lead to responses. In some examples, the logistic regression model may use a selection approach, such as forward selection, backward elimination, or stepwise selection. The propensity analyzer 114 can use such statistical analysis to identify and/or estimate the contributions of individual variables, such as individual digital channels and/or individual types of web pages, toward users performing, or not performing, the target user activity during visits to the website 104. Because a user may perform a variety of activities during a visit to the website 104, the statistical model used by the propensity analyzer 114 can consider website activity data 116 that identifies instances of the target user activity and/or other user activities associated with visits to the website.

For example, the propensity analyzer 114 can use a logistic regression formula to calculate probabilities that the target user activity will happen, based on contributions of different variables. In this example, a dependent variable can be the likelihood of the target user activity occurring, while independent variables may be different digital channels that can drive traffic to the website 104 and/or different types of web pages 106 that users can use as entry pages to the website 104. In some examples, the calculated probabilities can be expressed on a scale of 0 to 1, with 0 indicating that the target user activity is not likely to happen and 1 indicating that the target user activity is likely to happen. In some examples, the statistical model can use a linear logistic model having a form of Log $(\gamma)$(Target User Activity)$=\beta_0 x + \beta_1 x \ldots$, where $\beta$ values are beta coefficients that represent slopes of different variables x. The model can also be expresses as $$\log\left[\frac{p}{1-p}\right] = a + \beta x,$$

where a is an intercept parameter. The slope values $\beta$ can represent estimates associated with each variable.

In some examples, the propensity analyzer 114 can use one or more selection techniques to determine which variables, from a set of variables, are not contributing to the target user activity, and omit those variables from consideration within the model. For example, the logistic regression model discussed above may initially consider a set of variables, and the model may iteratively discard any variables that it finds are not sufficiently associated with the target response of whether users did or did not perform the target user activity. Accordingly, the model can keep variables determined to be the best predictors of the target user activity. In some examples, a forward selection technique can be used in which the model begins with zero variables, iteratively adds variables during the analysis, and discards variables from the model that that are determined to have low significance, such as a significance under a threshold value. In other examples, backwards elimination techniques can be used in which the model begins with a set of possible variables, and discards variables that are found to have low significance. A stepwise selection technique can also be used that incorporates both forward selection and backwards elimination. Overall, the selection technique can eliminate low-significance variables from the logistic regression model. Accordingly, statistically-determined estimates of contribution values generated by the propensity analyzer 114 can indicate which digital channels, and/or which types of entry pages, are most likely to drive users to perform the target user activity during their visit to the website 104, and thus have the highest propensities to drive the target user activity. Non-limiting examples of statistical analyses that can be performed by the propensity analyzer 114 are discussed in more detail below with respect to FIG. 5 and FIGS. 8-10.

The propensity analyzer 114 can accordingly generate and/or output website propensity data 118 that includes determined propensities associated with web pages 106, digital channels, and/or combinations of web pages 106 and digital channels. In some examples, the website propensity data 118 generated by the propensity analyzer 114 may also include recommendations for revising one or more web pages 106 and/or digital channels based on relative differences between determined propensities associated with different web pages and/or different digital channels.

As a first example, due to differences in content, placement, and other attributes of CTAs on different web pages 106, some web pages 106 may have a higher propensity than other web pages 106 to drive users to engage in the target user activity. The propensity analyzer 114 can evaluate website activity data 116, as described further below, to determine which web pages 106 are higher-propensity web pages that have relatively high likelihoods of driving users to engage in the target user activity. The propensity analyzer 114 may also determine, from the website activity data 116, that other web pages 106 are lower-propensity web pages that have relatively low likelihoods of driving users to engage in the target user activity. In some examples, the propensity analyzer 114 can compare the higher-propensity web pages against the lower-propensity web pages to determine differences in content and/or placement of CTAs on those web pages, and output website propensity data 118 that recommends modifying the lower-propensity web pages to have CTAs with the same or similar content and/or placement as the CTAs of the higher-propensity web pages.

As another example, the propensity analyzer 114 may generate, based on an analysis of the website activity data 116, website propensity data 118 that indicates propensities of different types of digital channels to drive users to engage in the target user activity. In some examples, operators of the website may use the website propensity data 118 to identify one or more high-propensity digital channels, and prioritize resources in association with the one or more high-propensity digital channels. For instance, the operators may choose to allocate higher budgets and/or assign more developers to work on the digital channels that the website propensity data 118 indicates have the highest propensities to drive users to engage in the target user activity. Alternatively, or in addition, such operators may use the website propensity data 118 to identify lower-propensity digital channels, and allocate resources to improve the propensities associated with one or more of the identified lower-propensity digital channels.

As still another example, the website propensity data 118 may indicate that a certain web page 106 has a relatively high propensity to drive users to engage in the target user activity, but that search engines are driving more traffic to other lower-propensity web pages 106. In this situation, the website propensity data 118 may indicate that the content and/or design of the high propensity web page 106 should be modified according to search engine optimization strategies, such that search engines begin directing more traffic to the high propensity web page 106. In some examples, the website propensity data 118 may recommend modifying web pages 106 with high propensities, but relatively low traffic, to include content and/or design elements from other higher-traffic web pages 106. For instance, if lower-propensity web pages 106 are receiving more traffic from search engines than higher-propensity web pages 106 due to certain key words, font sizes, image placements, and/or other elements, the website propensity data 118 can recommend modifying the higher-propensity web pages 106 to include the key words, font size, image placements, or other elements that may have been driving search engine traffic to the lower-propensity web pages 106. Accordingly, such changes can cause search engines to direct an increased level of traffic to the identified higher-propensity web pages 106.

As another example, the website propensity data 118 may be an alert or other notification indicating that the propensity of one type of entry page, and/or one type of digital channel, to drive the target user activity has fallen below a predetermined threshold relative to one or more other types of entry pages and/or digital channels. For instance, as web pages 106 are updated over time, the propensity analyzer 114 may determine that propensities of a particular type of web page 106 to drive the target user activity has fallen behind corresponding propensities of other types of web pages 106 to drive the target user activity by more than 10%, or any other threshold. The propensity analyzer 114 can generate website propensity data 118 that includes an alert or other notification indicating that the propensity of the particular type of web page 106 to drive the target user activity is lagging behind corresponding propensities of other types of web pages 106. Such a notification may indicate an opportunity to revise the particular type of web page 106 to increase its propensity to drive the target user activity, for instance to incorporate changes previously made to the other types of web pages 106 that have already increased their propensities to drive the target user activity.

FIG. 2 shows an example of various digital channels 200 that can drive user visits to the website 104. As discussed above, a user of a user device 108 can initially access the website 104 through a digital channel 110. Types of digital channels can include direct load 202, display advertisements 204, email advertisements 206, search engine optimization (SEO) 208, search engine marketing (SEM) 210, social media 212, text advertisements 214, print media 216, and/or other digital channels.

Direct load 202 visits to the website 104 can occur when a user directly enters a URL for the website 104, such as a URL for a homepage of the website 104 or for any other particular web page 106 of the website 104. For example, direct load 202 visits can include visits when a user typed in a URL for the website 104 without being prompted to do so by an advertisement.

Display advertisement 204 visits to the website 104 can occur when a user clicks on a banner advertisement, or other type of advertisement, that was displayed on a different website. Links associated with such display advertisements can cause a web browser on the user's user device to be redirected to a corresponding entry page on the website 104.

Email advertisement 206 visits to the website 104 can occur when a user clicks on a link in an email that redirects the user to an entry page on the website 104. Links in such email advertisements can cause a web browser on the user's user device to be redirected to a corresponding entry page on the website 104.

SEO 208 visits to the website 104 can occur when a user clicks on a link presented as an organic search result within a search engine. For example, when a user enters search terms into a search engine, algorithms of the search engine can cause a list of search results to be displayed. Each search result can be a link to a web page, and the search engine can sort the search results based on various factors such as relevancy of words on the web pages to the search terms, relationships between words on the web pages, how quickly the web pages load, how compatible the web pages are with mobile devices, and/or other factors. Links in such search results can cause a web browser on the user's user device to be redirected to a corresponding entry page on the website 104. Depending on the entered search terms, the search engine may display one or more links to different entry pages of the website 104.

SEM 210 visits to the website 104 can occur when a user clicks on a link associated with a paid advertisement presented in a search engine. For example, although a search engine can display organic search results in response to a user's search query as described above, when the search query matches criteria for a paid advertisement, the paid advertisement can also be displayed alongside the organic search results as sponsored or paid content. Such paid links can cause a web browser on the user's user device to be redirected to a corresponding entry page on the website 104.

Social media 212 visits to the website 104 can occur when a user clicks on a link presented in content or advertisements on a social media website or platform. Such social media links can cause a web browser on the user's user device to be redirected to a corresponding entry page on the website 104.

Text advertisement 214 visits to the website 104 can occur when a user clicks on a link presented in a text message or a multimedia message. Such text message links can cause a web browser on the user's user device to be redirected to a corresponding entry page on the website 104.

Print media 216 visits to the website 104 can occur when a user visits the website 104 in response to viewing an advertisement or other content in a magazine, mailer, or other print media 216. For example, a print advertisement may include a specialized URL associated with the website 104 and/or a corresponding entry page, such that visits to the website 104 that occur based on users entering that specialized URL can be identified as having occurred in response to the print media 216.

FIG. 3 shows an example of various groups of web pages 106 of an example website 300. The example website 300 can be associated with a company that offers products and services in areas such as insurance and finance. The groups of web pages 106 of the example website 300 can include a homepage 302, fire pages 304, auto pages 306, life pages 308, health pages 310, agent pages 312, bank pages 314, finance pages 316, payment pages 318, claim pages 320, search pages 322, quote pages 324, an insurance landing page 326, a multiline landing page 328, and/or groups of other types of web pages 106. As discussed above, a user device 108 can, via a digital channel 110, access a website by requesting a particular web page 106 of the website 104 from the server 102. The particular web page 106 of the website 104 that the user device 108 accesses first via a digital channel 110 can be considered an "entry page" or "landing page" for the user device 108. Accordingly, for the example website 300, the entry page for the user device 108 may be a web page 106 any of the example groups of web pages 106 shown in FIG. 3. The types of web pages 106 shown in FIG. 3 are not intended to be limiting, as the website 300 can include different types and/or groups of web pages, including fewer or more than are shown in FIG. 3. Additionally, in other examples, the systems and methods described herein can be used with other types of websites that have groupings of web pages associated with other types of products and/or services.

The homepage 302 can be a web page 106 that contains an introduction and/or general overview of the website 300. The homepage 302 may contain links to other web pages 106 of the website 300.

Fire pages 304, auto pages 306, life pages 308, and health pages 310 can include one or more web pages 106 that provide information associated with first insurance, automobile insurance, life insurance, and health insurance, respectively. For example, fire pages 304 can display information associated with homeowner's insurance, condominium insurance, and/or renter's insurance. The website 300 may also have other types of web pages 106 associated with other types of insurance.

Agent pages 312 can include one or more web pages 106 associated with insurance agents. For example, agent pages 312 can include web pages 106 for finding an insurance agent, micro websites that include one or more web pages 106 with content about individual insurance agents, web pages 106 for starting an insurance quote with the help of an insurance agent, and/or other agent-related web pages 106.

Bank pages 314 can include one or more web pages 106 associated with banking products and/or services. For example, bank pages 314 can include web pages 106 about checking accounts, saving accounts, credit cards, and/or other banking information.

Finance pages 316 can include one or more web pages 106 associated with financial products or services, such as investments and banking. In some examples, finance pages 316 may include links to bank pages 314, and/or bank pages 314 can link to finance pages 316.

Payment pages 318 can include one or more web pages 106 associated with making payments associated with the website 300. For example, payment pages 318 may allow users to view bills, pay bills, and/or make other types of payments.

Claim pages 320 can include one or more web pages 106 associated with filing new insurance claims, viewing claim information, and/or other claim-related information. In some examples, web pages 106 about claims for fire insurance, auto insurance, life insurance, health insurance, or other types of insurance may be considered to be claim pages 320 rather than fire pages 304, auto pages 306, life pages 308, or health pages 310. However, in other examples, some claim-related web pages 106 can be considered to be fire pages 304, auto pages 306, life pages 308, or health pages 310.

Search pages 322 can include one or more web pages 106 that allow users to search the website 300 and/or view search results. For example, one or more web pages 106 can include a search bar that users can use to enter search terms for a global or targeted search on the website 300, and the search pages 322 can include web pages 106 that display results of such a search.

Quote pages 324 can include one or more web pages 106 associated with insurance quotes. For example, a quote page 324 can allow a user to start a new insurance quote, view an existing quote, allow an agent to start a quote or help start a quote, and/or other quote-related web pages 106. In some examples, the target user activity for the website 300 can be a "quote start." Other web pages 106 of the website 300 may include CTAs 112 associated with quote starts that, if selected by a user, cause the user's user device to redirect to a quote page 324 that the user can use to obtain a new insurance quote. Accordingly, in these examples, CTAs 112 of the website 300 may attempt to drive users to one or more quote pages 324.

An insurance landing page 326 can be a web page 106 that serves as an overview of offered insurance products and services. For example, the insurance landing page 326 can include links to fire pages 304, auto pages 306, life pages 308, health pages 310, agent pages 312, claim pages 320, quote pages 324, the multiline landing page 328, and/or other insurance-related web pages 106.

A multiline landing page 328 can be a web page 106 that serves as an overview of multiline insurance coverage. For example, the multiline landing page 328 can include content that describes insurance coverage that includes both home and automobile insurance, and/or links to other web pages 106 that more specifically describe home insurance and automobile insurance.

As discussed above with respect to FIGS. 1-3, users may visit a website, such as website 300, by accessing entry pages of the website through various digital channels. Some digital channels may direct users to different entry pages of the website. For example, if a user directly types in a URL for the homepage 302 of the website 300, the entry page for that user can be the homepage 302 during a visit that occurs via the direct load 202 digital channel. However, if the user instead directly types in a URL for an insurance landing page 326, the entry page for the user can instead be the insurance landing page 326 during a visit that occurs via the direct load 202 digital channel. As another example, depending on a user's search query to a search engine, different organic and/or paid search results may be displayed. Accordingly, the user may be directed to different entry pages that correspond to different search terms during visits that occur via the SEO 208 digital channel and/or the SEM 210 digital channel.

The target user activity for the example website 300 can be quote starts. However, some entry pages, and/or the digital channels used to direct users to those entry pages, can be more effective than others at driving users to initiate new insurance quotes. For example, users who arrive on the website 300 at entry pages in a first group of web pages 106 via a first digital channel may have a higher propensity to initiate new insurance quotes, relative to other users who arrive on the website 300 via entry pages in other groups of web pages and/or via other digital channels. The systems and methods described herein can be used to determine propensities of different types of entry pages, different types of digital channels, and/or different combinations of entry pages and digital channels, to drive users to initiate new insurance quotes.

Figure 4:
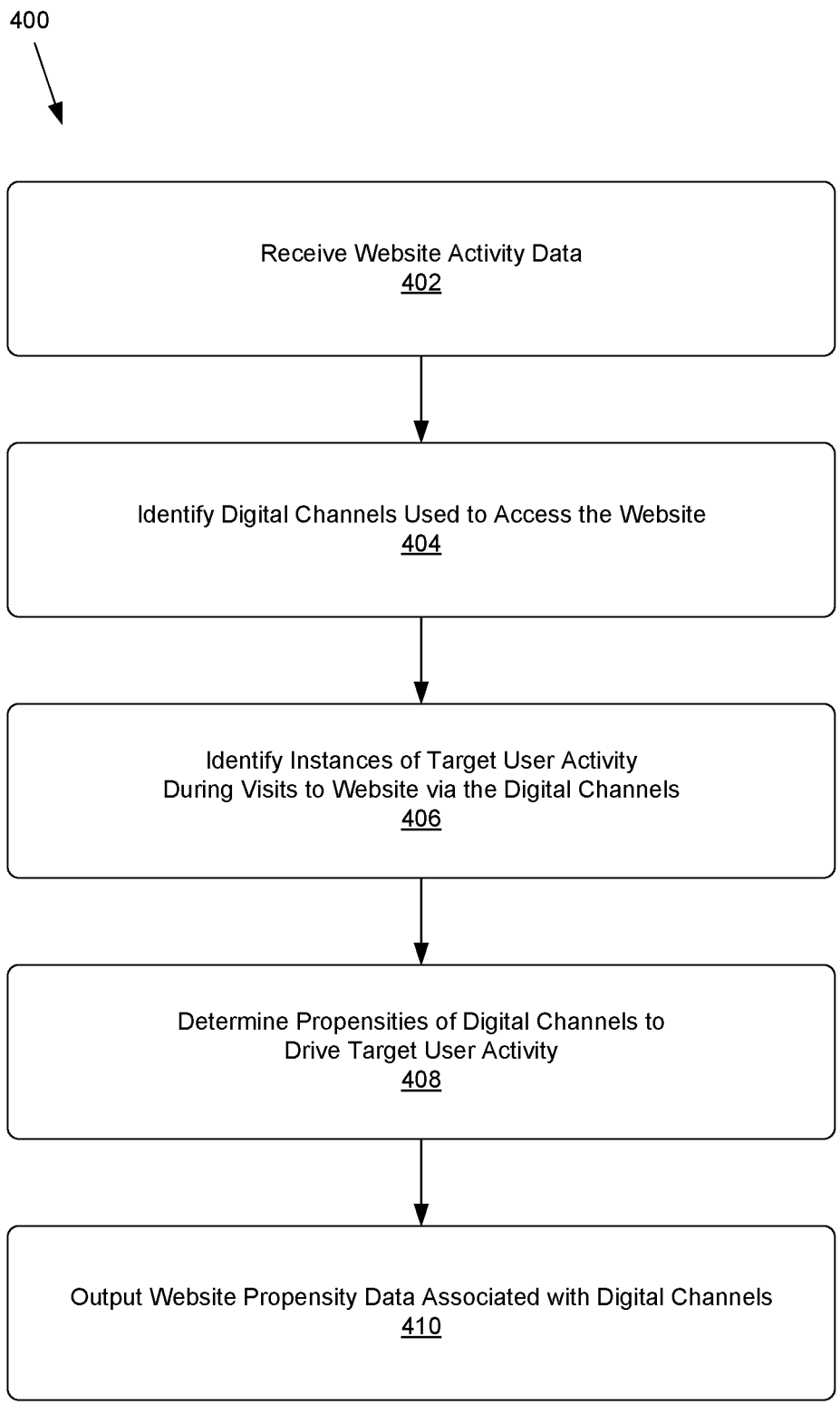
FIG. 4 shows a flowchart of an example method for determining propensities of digital channels to drive a target user activity on a website.

FIG. 4 shows a flowchart of an example method 400 for determining propensities of digital channels to drive a target user activity on a website 104. At block 402, the propensity analyzer 114 can receive website activity data 116. The propensity analyzer 114 can receive the website activity data 116 from the server 102 that hosts the website 104, from a web analytics service, and/or from any other source. The website activity data 116 may indicate which digital channels user devices used to access the website 104, and whether users associated with the user devices engaged in the target user activity during corresponding visits to the website 104.

In some examples, the website activity data 116 may indicate data about activities of one or more categories of users, such as customers and/or non-customers of a company. If the target user activity is an activity intended to convert non-customers into customers, the website activity data 116 may, based on cookie information or other data, identify website activity associated specifically with non-customers. As an example, the process of FIG. 4 can be used to identify when users who are not currently customers of an insurance company perform a target user activity of starting new insurance quotes via the example website 300. In this example, the website activity data 116, or the source of the website activity data 116, may use cookie data or other data to identify visits to the website 300 from existing customers who already have insurance coverage through the company, and as such are less likely to start a new insurance quote. The website activity data 116, or the source of the website activity data 116, may similarly use cookie data or other data to identify visits to the website 300 from users who are not currently customers of the insurance company. Accordingly, in some examples, the propensity analyzer 114 may not receive, or may ignore, website activity data 116 associated the current customers, and may instead analyze the website activity data 116 associated with non-customers during the process of FIG. 4.

At block 404, the propensity analyzer 114 can use the website activity data 116 to identify which digital channels 200 were used to access the website 104 over a period of time. As discussed above, different users may use different digital channels to access the website 104. The propensity analyzer 114 can be configured to determine, from referring page identifiers, cookie data, and/or other information in the website activity data 116, which digital channels were used to access the website 104, and/or how often such digital channels were used to access the website 104. For example, the propensity analyzer 114 may determine which of, and/or how often, various digital channels such as direct load 202, display advertisements 204, email advertisements 206, SEO 208, SEM 210, social media 212, text advertisements 214, and/or print media 216 digital channels shown in FIG. 2 were used to access the website 104. As noted above, in some examples the propensity analyzer 114 can identify website activity data 116 associated with certain categories of users, and/or ignore website activity data 116 associated with categories of users who may not be likely to be associated with the target user activity.

At block 406, the propensity analyzer 114 can use the website activity data 116 to identify instances of the target user activity that occurred on the website 104 after users arrived on the website via the digital channels identified at block 404. The propensity analyzer 114 can also associate and/or correlate instances of the target user activity with corresponding digital channels. For example, if the propensity analyzer 114 determines from the website activity data 116 that a user engaged in the target user activity while on the website 104, the propensity analyzer 114 can determine which type of digital channel was associated with that user's visit to the website 104.

At block 408, the propensity analyzer 114 can perform a statistical analysis on the data identified during blocks 404 and 406 to generate estimates of the propensities of individual digital channels to drive the target user activity. In some examples, the data captured and tracked during blocks 402 through 406 can be stored in a database or other repository over a period of time, such as a day, a week, a month, or any other time period, and a set of data collected over the time period can later be analyzed at block 408.

As discussed above, the statistical analysis can be based on regression, linear regression, decision tree modeling, and/or other statistical analysis techniques. As a non-limiting example, the statistical analysis performed during block 408 can be based on a logistic regression model that uses different digital channels as variables, and identifies contributions of different digital channels to a response associated with the target user activity occurring. Accordingly, the statistically determined estimates of contribution values produced during block 408 can indicate individual and/or relative propensities of different digital channels to drive users to perform the target user activity during visits to the website 104.

In some examples, the statistical analysis performed during block 408 can use a logistic regression model, such as a linear logistic model, that identifies variables that lead to responses. This model can be the same or a similar model described above with respect to FIG. 1, such as a logistic regression model that uses forward selection, backward elimination, or stepwise selection. The variables considered by the logistic regression model can include variables for one or more digital channels. Overall, at block 408 the statistical analysis can identify or estimate the contributions of individual variables, such as individual types of digital channels, toward users performing or not performing the target user activity during their visits to the website 104. Accordingly, the statistically determined estimates of contribution values produced during block 608 can indicate which digital channels are most likely to drive users to perform the target user activity during their visit to the website 104.

At block 410, the propensity analyzer 114 can output website propensity data 118 associated with the digital channels. For example, the website propensity data 118 can identify at least some of the individual and/or relative propensities of different digital channels, determined at block 408, to drive users to perform the target user activity during visits to the website 104.

Figures 5A, 5B:
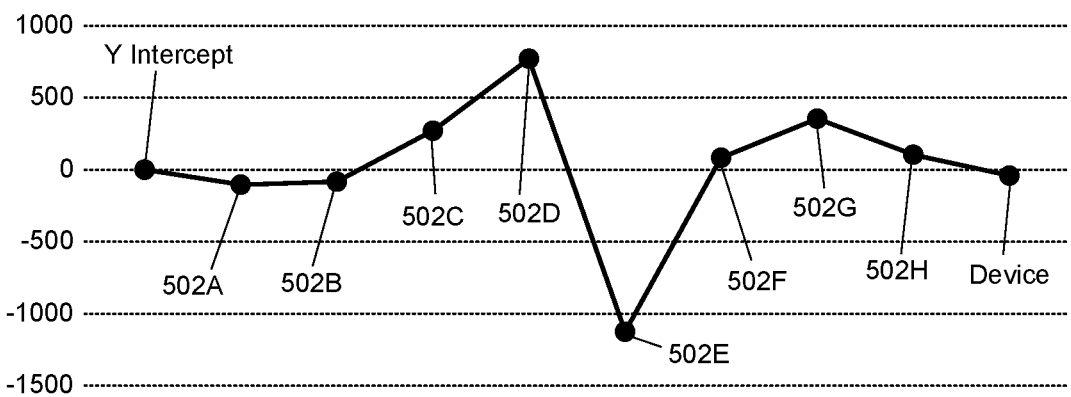
FIG. 5A shows an example chart of estimates and other statistical values associated with a set of digital channels, as determined by a propensity analyzer using a logistic model.
FIG. 5B shows an example graph, corresponding to the example chart of FIG. 5A, of propensity estimates of the set of digital channels to drive a target user activity.

As an example, FIGS. 5A and 5B show a chart and graph of statistically determined estimates and other values associated with different types of digital channels that can be produced by the propensity analyzer 114 via the method 400 shown in FIG. 4. The propensity analyzer 114 can consider, as variables, a set of digital channels 502A through 502H, and use a logistic model to determine relative propensities associated with digital channels 502A through 502H to drive a target user activity on a website 104, such as quote starts on website 300. Any or all of the information shown in FIGS. 5A and/or 5B, or similar corresponding information, can be output by the propensity analyzer 114 as website propensity data 118 at block 410.

FIG. 5A shows an example chart of estimates and other statistical values associated with the digital channels 502A through 502H, as determined by the propensity analyzer 114 using a logistic model. For example, the propensity analyzer 114 can determine that digital channel 502B is associated with an estimate value of −0.0807, while digital channel 502D is associated with an estimate value of 0.7713. As shown in FIG. 5, in some examples the propensity analyzer 114 can consider other variables, besides digital channels, during the statistical analysis, such as device types of user devices used to access the website 100 as indicated in the website activity data 116.

FIG. 5B shows an example graph, corresponding to the example chart of FIG. 5A, of the propensity estimates of the digital channels 502A through 502H to drive the target user activity. The graph of FIG. 5B visually shows statistically determined estimated contributions of multiple variables, including digital channels 502A through 502H, toward a target user activity. In the graph of FIG. 5B, the data can be normalized such that the graph represents the contributions of each variable if each variable were associated with 1000 visits to the website 104. The graph of FIG. 5B can correspond to an equation derived from the estimates shown in the chart of FIG. 5A, such as:

$$\log\left[\frac{p}{1-p}\right] = a + \beta x = -2.1775 -$$
$$0.0996_{Ch502A} - 0.0807_{Ch502B} + 0.2812_{Ch502C} + 0.7713_{Ch502D} -$$
$$1.1205_{Ch502E} + 0.0884_{Ch502F} + 0.3574_{Ch502G} + 0.0915_{Ch502H} - 0.0464_{Device}.$$

In some examples, FIGS. 5A and 5B can represent estimates of how likely individual digital channels are to lead to non-customers starting new insurance quotes on website 300. The example data shown in FIGS. 5A and 5B can show that, based on a sample of website activity data collected over a month or other period of time, non-customers visits to website 300 that occurred via digital channels 502C, 502D, and 502G had relatively high likelihoods of resulting in quote starts. However, the example data shown in FIGS. 5A and 5B can also indicate that other non-customer visits to the same website 300 that occurred via digital channels 502A and 502B were relatively unlikely to result in quote starts, and that non-customer visits that occurred via digital channel 502E were extremely unlikely to result in quote starts. Accordingly, website propensity data 118 corresponding to the example data shown of FIGS. 5A and 5B may indicate that the website 300 and/or digital channels should be reviewed and/or revised such that aspects of relatively high-propensity digital channels 502C, 502D, and 502G can be applied to lower-propensity digital channels 502A, 502B, and/or 502E in order to increase the propensities of digital channels 502A, 502B, and/or 502E. Alternatively, such website propensity data 118 may indicate that, because digital channels 502C, 502D, and 502G have the highest propensities to drive quote starts, budgetary resources, development resources, and/or other resources should be prioritized to increase the amount of user traffic to the website 300 that arrives via digital channels 502C, 502D, and/or 502G.

For instance, by normalizing the data to a common number of visits per digital channel, as shown in the example of FIGS. 5A and 5B, digital channels that are effective at driving the target user activity can be identified regardless of the amount of traffic that actually arrives via those digital channels. For example, if the analysis shows that digital channel 502D has a higher propensity than the other digital channels to lead to the target user activity, but that digital channel 502D is not associated with as much user traffic as other digital channels, budgetary or development resources associated with digital channel 502D can be increased in an attempt to increase the amount of user traffic that arrives via high-propensity digital channel 502D.

Overall, the process of FIG. 4 can determine relative propensities of different digital channels to drive the target user activity. For example, the determined propensity data may indicate that visits to the example website 300 that occurred via the SEO 208 and the SEM 210 digital channels had relatively high propensities to lead to quote starts. However, users may arrive at the website 300, via SEO 208 and SEM 210 digital channels, on different entry pages. Some of those entry pages may themselves have higher or lower propensities to lead to the target user activity. However, the method of FIG. 6 can be used to identify propensities of different groups of entry pages to lead to the target user activity. The method of FIG. 7 can also be used to identify propensities of different combinations of digital channels and entry pages to lead to the target user activity.

Figure 6:
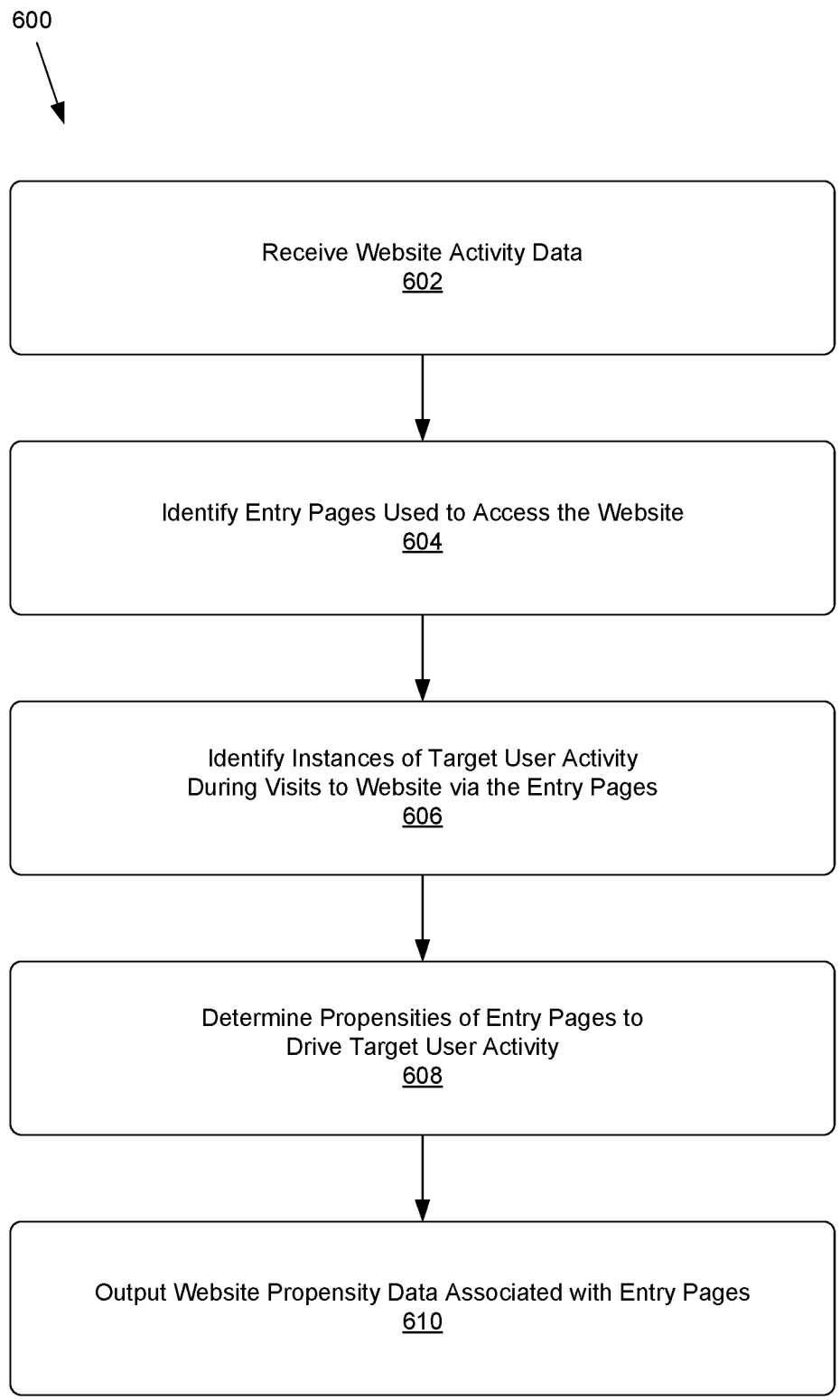
FIG. 6 shows a flowchart of an example method for determining propensities of entry pages to drive a target user activity on a website.

FIG. 6 shows a flowchart of an example method 600 for determining propensities of entry pages to drive a target user activity on a website 104. At block 602, the propensity analyzer 114 can receive website activity data 116. The propensity analyzer 114 can receive the website activity data 116 from the server 102 that hosts the website 104, from a web analytics service, and/or from any other source. The website activity data 116 may indicate which specific web pages 106 and/or groups of web pages 106 were used by user devices as entry pages to the website 104, and whether users associated with the user devices engaged in the target user activity via the entry pages and/or during corresponding visits to the website 104. As discussed above with respect to FIG. 4, in some examples, the website activity data 116 may indicate data about activities of one or more categories of users, such as customers and/or non-customers of a company. In these examples, the propensity analyzer 114 may not receive, or may ignore, website activity data 116 associated the current customers, and may instead analyze the website activity data 116 associated with non-customers during the process of FIG. 6.

At block 604, the propensity analyzer 114 can use the website activity data 114 to identify which web pages 106 were used as entry pages to the website 100 over a period of time. For example, the propensity analyzer 114 may determine which of, and/or how often, web pages 106 such as the homepage 302, fire pages 304, auto pages 306, life pages 308, health pages 310, agent pages 312, bank pages 314, finance pages 316, payment pages 318, claim pages 320, search pages 322, quote pages 324, the insurance landing page 326, and/or the multiline landing page 328 of the example website 300 shown in FIG. 3 were used as entry pages to website 300. As noted above, in some examples the propensity analyzer 114 can identify website activity data 114 associated with certain categories of users, and/or ignore website activity data 114 associated with categories of users who may not be likely to be associated with the target user activity.

At block 606, the propensity analyzer 114 can use the website activity data 116 to identify instances of the target user activity that occurred on the website 104 after users arrived on the website via the entry pages identified at block 604. The propensity analyzer 114 can also associate and/or correlate instances of the target user activity with corresponding entry pages. For example, if the propensity analyzer 114 determines from the website activity data 116 that a user engaged in the target user activity while on the website 104, the propensity analyzer 114 can determine which specific web page 106, or type of web page 106, that user used as an entry page during the user's visit to the website 104.

At block 608, the propensity analyzer 114 can perform a statistical analysis on the data identified during blocks 604 and 606 to generate estimates of the propensities of individual entry pages, or groups of entry pages, to drive the target user activity. In some examples, the data captured and tracked during blocks 602 through 606 can be stored in a database or other repository over a period of time, such as a day, a week, a month, or any other time period, and a set of data collected over the time period can later be analyzed at block 608.

As discussed above, the statistical analysis can be based on regression, linear regression, decision tree modeling, and/or other statistical analysis techniques. As a non-limiting example, the statistical analysis performed during block 608 can be based on a logistic regression model that uses different types of entry pages as variables, and identifies contributions of different types of entry pages to a response associated with the target user activity occurring. Accordingly, the statistically determined estimates of contribution values produced during block 608 can indicate individual and/or relative propensities of different types of entry pages to drive users to perform the target user activity during visits to the website 104.

In some examples, the statistical analysis performed during block 608 can use a logistic regression model, such as a linear logistic model, that identifies variables that lead to responses. This model can be the same or a similar model described above with respect to FIG. 1, such as a logistic regression model that uses forward selection, backward elimination, or stepwise selection. The variables considered by the logistic regression model can include different groups of entry pages instead or, or in addition to, variables for one or more digital channels. Overall, at block 608 the statistical analysis can identify or estimate the contributions of individual variables, such as individual groups of entry pages, toward users performing or not performing the target user activity during their visits to the website 104. Accordingly, the statistically determined estimates of contribution values produced during block 608 can indicate which groups of entry pages are most likely to drive users to perform the target user activity during their visit to the website 104.

At block 610, the propensity analyzer 114 can output website propensity data 118 associated with the entry pages. The website propensity data 118 can identify at least some of the individual and/or relative propensities of different types of entry pages, determined at block 608, to drive users to perform the target user activity during visits to the website 104. For example, the website propensity data 118 may indicate that one type of entry page has a higher propensity to drive users to perform the target user activity during visits to the website 104 than another type of entry page.

In some examples, the propensity analyzer 114 can also generate and output website propensity data 118 that recommends one or more changes to one or more web pages 106. For example, if the propensity analyzer 114 determines that a first type of entry page has a higher propensity to drive users to perform the target user activity during visits to the website 104 than a second type of entry page, the propensity analyzer 114 may determine differences between CTAs 112 associated with the first type of entry page and the second type of entry page. If the CTAs 112 differ with respect to content, placement, and/or other attributes on the first type of entry page and the second type of entry, the propensity analyzer 114 can generate website propensity data 118 that includes revision recommendations for the CTAs 112 of the second type of entry page based on the CTAs 112 of the first type of entry page.

As an example, if the higher-propensity first type of entry page has CTAs 112 located at a different position than CTAs 112 on the lower-propensity second type of entry page, the website propensity data 118 may recommend moving the CTAs 112 on the second type of entry page to a position where corresponding CTAs 112 are located on the first type of entry page. For instance, as discussed above with respect to FIG. 1, web page 106A may have a CTA 112 positioned relatively close to the top of web page 106A, while web page 106B has a similar CTA 112 positioned lower that is not visible on the user device 108 until a user scrolls down web page 106B. In this case, if the propensity analyzer 114 determines that web page 106A has a higher propensity to drive the target user activity than web page 106B, the propensity analyzer 114 can identify the differences in placement between the CTAs 112 on web page 106A and web page 106B, and generate website propensity data 118 that recommends moving the CTA 112 on web page 106B to the position the CTA 112 is located on higher-propensity web page 106B. As another example, if the higher-propensity first type of entry page has CTAs 112 that include key words, fonts, font sizes, colors, and/or other content or design elements that are different from CTAs on the lower-propensity second type of entry page, the website propensity data 118 may recommend changing the CTAs 112 on the second type of entry page to include content and/or design elements of corresponding CTAs 112 of the first type of entry page.

In some examples, the propensity analyzer 114 can automatically implement content and/or design changes of a web page 106 based on the website propensity data 118. For example, the propensity analyzer 114 can adjust Hypertext Markup Language (HTML) code, Cascading Style Sheets (CSS) code, and/or other code associated with a web page 106 change the content and/or placement of a CTA 112 and/or other elements based on recommendations generated by the propensity analyzer 114. In some examples, the adjusted code can be automatically generated as a new draft version of the web page 106 by the propensity analyzer 114, and a human developer can determine whether or not to incorporate the automatically-generated version of the web page 106 into the website 104. In other examples, human developers can review revision recommendations for web pages 106 generated by the propensity analyzer 114, and manually revise web pages 106 accordingly.

In some examples, the propensity analyzer 114 can use the process of FIG. 6 to, regardless of which digital channels users used to arrive at the website 104, determine relative propensities of different types of entry pages to drive users to perform a target user activity on the website 104. However, in other examples, the propensity analyzer 114 can use the process of FIG. 6 to determine relative propensities of different types of entry pages to drive users to perform a target user activity on the website 104, in association with a specific type of digital channel. For instance, at block 604, the propensity analyzer 114 may be configured to identify website activity data 116 associated with visits to the website 104 that occurred via one specific digital channel, and to determine entry pages used to access the website 104 that that specific digital channel. Accordingly, the propensity analyzer 114 can use blocks 606 through 608 to determine propensities of different types of entry pages to drive the target user activity, if those entry pages are visited via the specific digital channel being analyzed.

The propensity analyzer 114 can also, or alternately, determine propensities to drive the target user activity that are associated with combinations of digital channels and entry pages. For example, the propensity analyzer 114 can determine which combination of a digital channel and an entry page type has the highest propensity to drive users to perform the target user activity.

Figure 7:
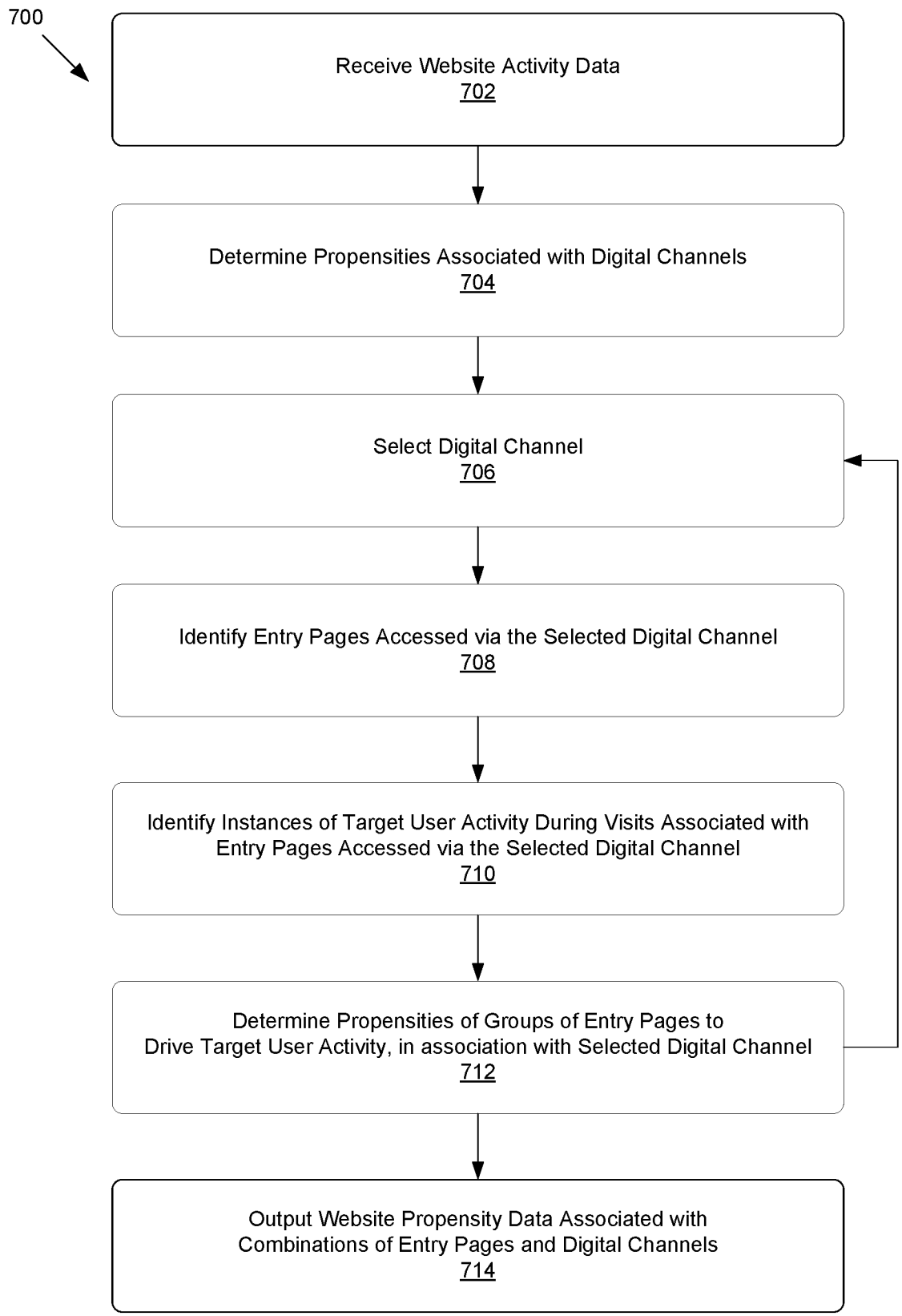
FIG. 7 shows a flowchart of an example method for determining propensities of combinations of digital channels and entry pages to drive a target user activity on a website.

FIG. 7 shows a flowchart of an example method 700 for determining propensities of combinations of digital channels and entry pages to drive a target user activity on a website 104. At block 702, the propensity analyzer 114 can receive website activity data 116. The propensity analyzer 114 can receive the website activity data 116 from the server 102 that hosts the website 104, from a web analytics service, and/or from any other source. The website activity data 116 may indicate which specific and/or groups of web pages 106 were used by user devices as entry pages to the website 104, and whether users associated with the user devices engaged in the target user activity on the entry pages and/or during corresponding visits to the website 104. As discussed above with respect to FIGS. 4 and 6, in some examples, the website activity data 116 may indicate data about activities of one or more categories of users, such as customers and/or non-customers of a company. In these examples, the propensity analyzer 114 may not receive, or may ignore, website activity data 116 associated the current customers, and may instead analyze the website activity data 116 associated with non-customers during the process of FIG. 7.

At block 704, the propensity analyzer 114 can determine relative propensities associated with two or more digital channels. For example, the propensity analyzer 114 can use the method 400 described above with respect to FIG. 4 to determine relative propensities of a set of digital channels to drive the target user activity.

At block 706, the propensity analyzer 114 can select one of the digital channels analyzed at block 704. In some examples, the propensity analyzer 114 can determine a subset of the digital channels analyzed at block 704 that were determined to have the highest propensities to drive the target user activity. For instance, the propensity analyzer 114 may use propensity data, such as data shown in the examples of FIGS. 5A and 5B, to identify two digital channels with the two highest propensities of driving the target user activity. The propensity analyzer 114 can then select one of the identified highest-propensity digital channels at block 706.

At block 708, the propensity analyzer 114 can use the website activity data 116 to identify which web pages 106 were used as entry pages to the website 104 over a period of time, when such entry pages were accessed via the digital channel selected at block 706. As noted above, different user visits to the website 104 may be initiated via many different entry pages, even if all of them occur via the same digital channel 200. For instance, in the example of FIG. 3, a user who types "auto insurance" into a search engine may be presented with search results including a link to an auto page 306, while another user who types "insurance agent" as a search query may be given search results including a link to an agent page 312. Accordingly, even though both users in this example may arrive at the website 300 via the SEO 208 digital channel based on organic search results, the entry pages for the two users may be in different groups of web pages 106 shown in FIG. 3. Accordingly, if the selected digital channel is the SEO 208 digital channel shown in FIG. 2, the propensity analyzer 114 may determine which of, and/or how often, the entry pages shown in the example of FIG. 3 were associated with user visits that arrived via the SEO 208 digital channel. As noted above, in some examples the propensity analyzer 114 can identify website activity data 116 associated with certain categories of users, and/or ignore website activity data 116 associated with categories of users who may not be likely to be associated with the target user activity.

At block 710, the propensity analyzer 114 can use the website activity data 116 to identify instances of the target user activity that occurred on the website 104 after users arrived on the website via the digital channel selected at block 706 and via the entry pages identified at block 708. The propensity analyzer 114 can also associate and/or correlate instances of the target user activity with corresponding entry pages. For example, if the propensity analyzer 114 determines from the website activity data 116 that a user engaged in the target user activity while on the website 104, the propensity analyzer 114 can determine which specific web page 106, or type of web page 106, that user used as an entry page during the user's visit to the website 104. In some examples, a user may arrive on an entry page in one group of web pages 106, but navigate through the website 104 to web pages 106 in other groups. Accordingly, the propensity analyzer 114 can use the website activity data 116 to determine whether users ultimately performed the target user activity during their visits to the website 104, as well as which entry page those users initially used to access the website 104 during their visits.

At block 712, the propensity analyzer 114 can perform a statistical analysis on the data identified during blocks 708 and 710 to generate estimates of the propensities of individual entry pages, or groups of entry pages, to drive the target user activity, when such entry pages are visited via the digital channel selected at block 706. In some examples, the data captured and tracked during blocks 702-710 can be stored in a database or other repository over a period of time, such as a day, a week, a month, or any other time period, and a set of data collected over the time period can later be analyzed at block 712.

As discussed above, the statistical analysis can be based on regression, linear regression, decision tree modeling, and/or other statistical analysis techniques. As a non-limiting example, the statistical analysis performed during block 712 can be based on a logistic regression model that uses different types of entry pages as variables, and identifies contributions of different types of entry pages to a response associated with the target user activity occurring. Accordingly, the statistically-determined estimates of contribution values produced during block 712 can indicate individual and/or relative propensities of different types of entry pages to drive users to perform the target user activity during visits to the website 104, when such visits occur via the digital channel selected at block 706.

In some examples, the statistical analysis performed during block 712 can use a logistic regression model, such as a linear logistic model, that identifies variables that lead to responses. This model can be the same or a similar model described above with respect to FIG. 1, such as a logistic regression model that uses forward selection, backward elimination, or stepwise selection. However, here the variables considered by the logistic regression model can include different groups of entry pages instead or, or in addition to, variables for one or more digital channels. Overall, at block 712 the statistical analysis can identify or estimate the contributions of individual variables, such as individual groups of entry pages, toward users performing or not performing the target user activity during their visits to the website 104. Accordingly, the statistically determined estimates of contribution values produced during block 712 can indicate which groups of entry pages are most likely to drive users to perform the target user activity during their visit to the website 104.

After determining propensities of entry pages, when visited via a selected digital channel, to drive the target user activity, the propensity analyzer 114 may select a different digital channel at block 706. The propensity analyzer 114 may then repeat blocks 708 through 712 to determine propensities of entry pages, when visited via the different selected digital channel, to drive the target user activity. The propensity analyzer 114 can repeat blocks 706 through 712 for any number of digital channels. For example, if after block 704 the propensity analyzer 114 identified the two digital channels with the highest propensities of driving the target user activity, the propensity analyzer 114 repeat blocks 706 through 712 for each of the identified top two highest propensity digital channels.

At block 714, the propensity analyzer 114 can output website propensity data 118 associated with one or more of the analyzed combinations of digital channels and entry pages. In some examples, the website propensity data 118 may identify a single combination of a digital channel and entry page that has the highest estimated propensity to drive the target user activity. In other examples, the website propensity data 118 may indicate relative propensities associated with multiple combinations of digital channels and entry pages.

Figures 8A, 8B:
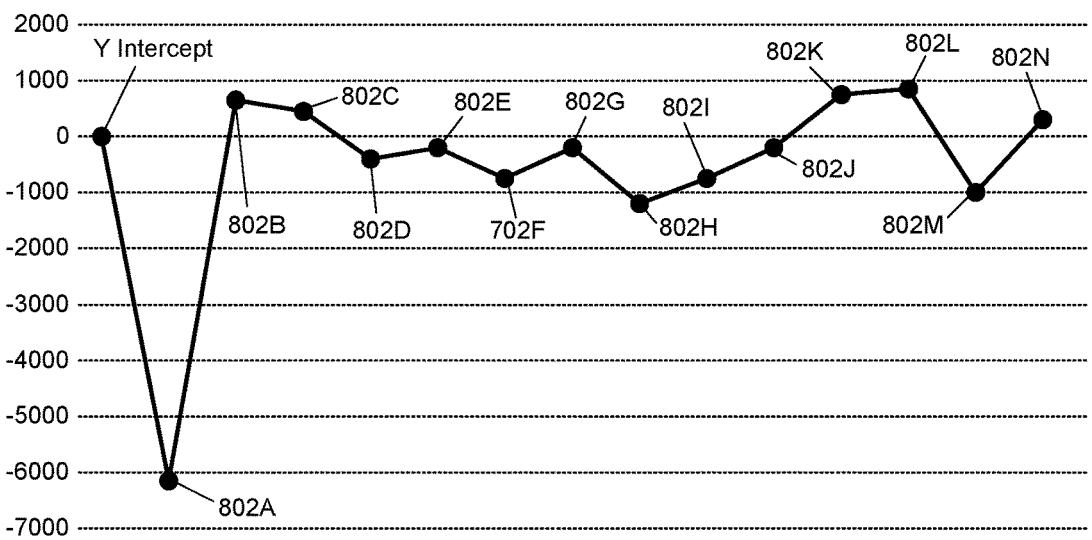
FIG. 8A shows an example chart of estimates and other statistical values associated with a set of entry pages, as determined by the propensity analyzer using a logistic model based on user traffic that arrived via a first digital channel.
FIG. 8B shows an example graph, corresponding to the example chart of FIG. 8A, of propensity estimates of the set of entry pages to drive the target user activity, when user traffic arrives via the first digital channel.
Figures 9A, 9B:
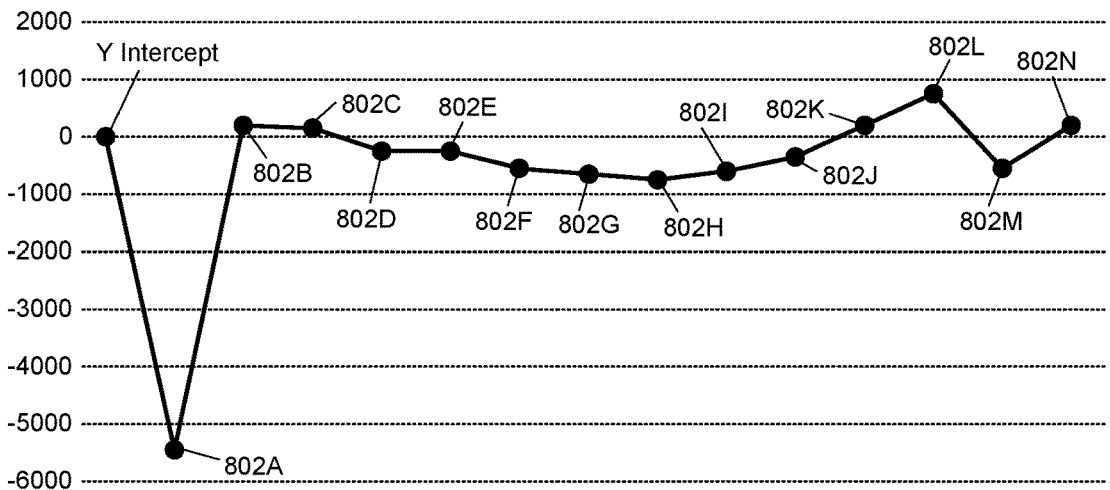
FIG. 9A shows an example chart of estimates and other statistical values associated with a set of entry pages, as determined by the propensity analyzer using a logistic model based on user traffic that arrived via a second digital channel.
FIG. 9B shows an example graph, corresponding to the example chart of FIG. 9A, of propensity estimates of the set of entry pages to drive the target user activity, when user traffic arrives via the second digital channel.
Figure 10:
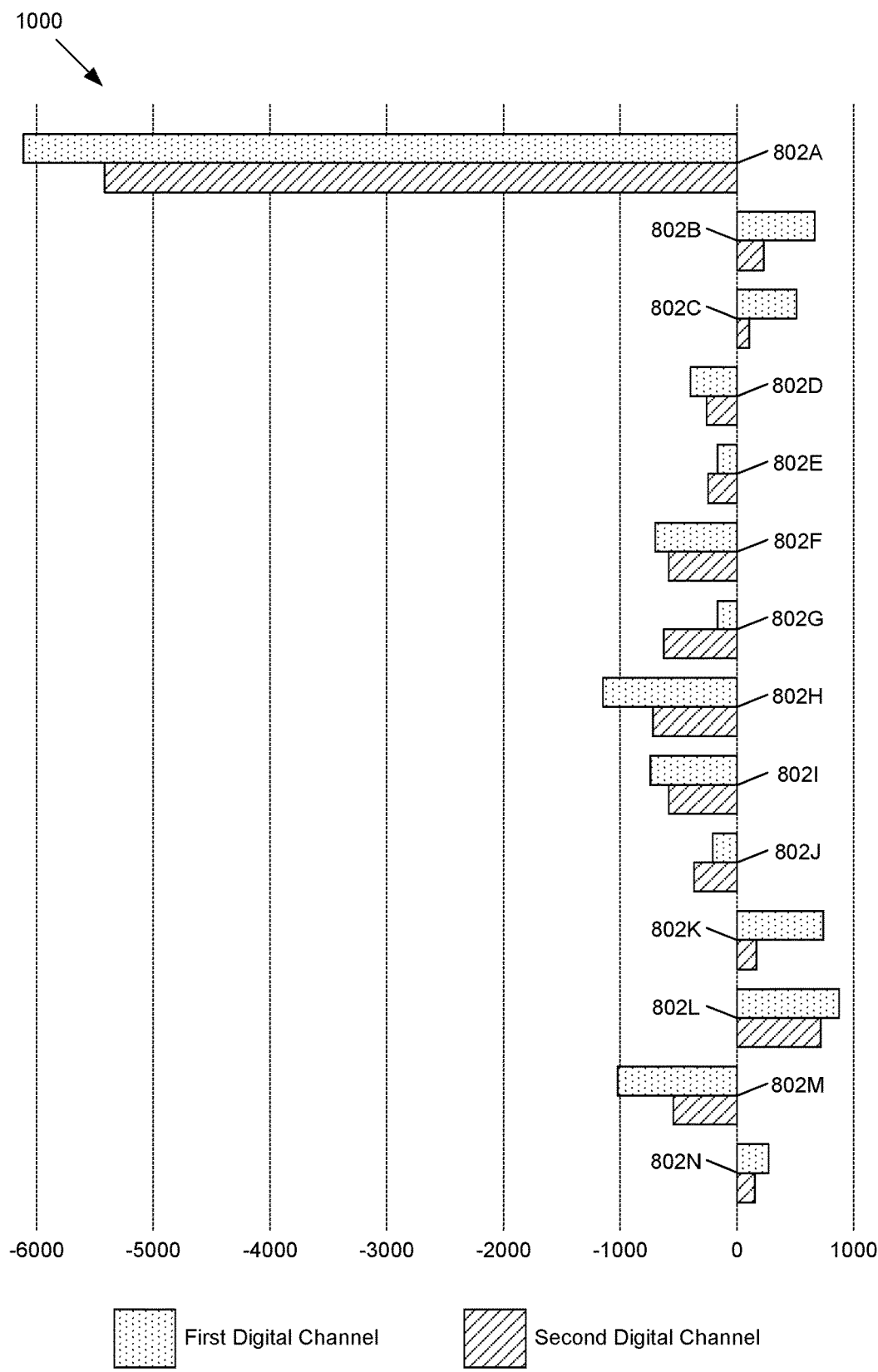
FIG. 10 displays an example bar graph that compares website propensity data associated with the set of entry pages with respect to visits that occurred via the first digital channel and the second digital channel.

As an example, FIGS. 8A and 8B show examples of website propensity data 118 associated with a set of entry pages 802A through 802N when visited via a first digital channel, while FIGS. 9A and 9B show examples of website propensity data 118 associated with the same set of entry pages 802A through 802N when visited via a second digital channel. FIG. 10 displays an example bar graph 1000 that compares website propensity data 118 associated with the set of entry pages 802A through 802N with respect to visits that occurred via the first digital channel and the second digital channel. Any or all of the information shown in FIGS. 8A, 8B, 9A, 9B, and/or 10, or similar corresponding information, can be output by the propensity analyzer 114 as website propensity data 118 at block 714.

In particular, FIG. 8A shows an example chart of estimates and other statistical values associated with the set of entry pages 802A through 802N, as determined by the propensity analyzer 114 using a logistic model based on user traffic that arrived via the first digital channel. FIG. 9A shows a similar example chart of estimates and other statistical values associated with the set of entry pages 802A through 802N, as determined by the propensity analyzer 114 using the logistic model based on user traffic that arrived via the second digital channel.

FIG. 8B shows an example graph, corresponding to the example chart of FIG. 8A, of the propensity estimates of the set of entry pages 802A through 802N to drive the target user activity, when user traffic arrives via the first digital channel. The example graph of FIG. 8B visually shows statistically determined estimated contributions of multiple variables, the various type of entry pages 802A through 802N, toward a target user activity when user traffic arrives via the first digital channel. In the example graph of FIG. 8B, the data can be normalized such that the graph represents the contributions of each variable if each variable were associated with 1000 visits to the website 104 that occurred via the first digital channel. The graph of FIG. 8B can correspond to an equation derived from the estimates shown in the chart of FIG. 8A, such as:

$$\log\left[\frac{p}{1-p}\right] =$$

$$a + \beta x = -2.9862 - 6.1356_{Page802A} + 0.6652_{Page802B} + 0.5090_{Page802C} -$$

$$0.4011_{Page802D} - 0.1606_{Page802E} - 0.7028_{Page802F} - 0.1685_{Page802G} -$$

$$1.1516_{Page802H} - 0.7740_{Page802I} - 0.2115_{Page802J} +$$

$$0.7393_{Page802K} + 0.8733_{Page802L} - 1.0204_{Page802M} + 0.2741_{Page802N}.$$

FIG. 9B shows an example graph, corresponding to the example chart of FIG. 9A, of the propensity estimates of the set of entry pages 802A through 802N to drive the target user activity, when user traffic arrives via the second digital channel. The example graph of FIG. 9B visually shows statistically determined estimated contributions of multiple variables, the various type of entry pages 802A through 802N, toward a target user activity when user traffic arrives via the second digital channel. In the example graph of FIG. 9B, the data can be normalized such that the graph represents the contributions of each variable if each variable were associated with 1000 visits to the website 104 that occurred via the second digital channel. The graph of FIG. 9B can correspond to an equation derived from the estimates shown in the chart of FIG. 9A, such as:

$$\log\left[\frac{p}{1-p}\right] =$$

$$a + \beta x = -1.9403 - 5.4272_{Page802A} + 0.2299_{Page802B} + 0.0802_{Page802C} -$$

$$0.2637_{Page802D} - 0.24681606_{Page802E} - 0.5863_{Page802F} -$$

$$0.6322_{Page802G} - 0.7217_{Page802H} - 0.5872_{Page802I} - 0.3709_{Page802J} +$$

$$0.1699_{Page802K} + 0.7222_{Page802L} - 0.5356_{Page802M} + 0.1546_{Page802N}.$$

In some examples, FIGS. 8A and 8B can represent estimates of how likely individual types of entry pages 802A through 802N are to lead to non-customers starting new insurance quotes on website 300, if visits to those entry pages 802A through 802N occur via a first one of the digital channels shown in FIG. 2. FIGS. 9A and 9B can represent similar estimates of how likely non-customers are to start new insurance quotes on website 300, if visits to the same entry pages 802A through 802N instead occurred via a second one of the digital channels shown in FIG. 2. FIG. 10 shows an example bar graph 1000 that compares the determined propensities associated with the set of entry pages 802A through 802N for the first digital channel and the second digital channel.

The example website propensity data 118 shown in FIGS. 8A, 8B, 9A, 9B, and/or 10 can indicate that entry pages 802B, 802C, 802K, 802L, and 802N have the highest propensities to drive the target user activity. However, the example website propensity data 118 shown in FIGS. 8A, 8B, 9A, 9B, and/or 10 can also indicates that other types of entry pages were much less likely to result in the target user activity. For example, the example website propensity data 118 can indicate that users were especially unlikely to engage in the target user activity when the users arrived at the website via entry pages 802A.

The example bar graph 1000 shown in FIG. 10, and/or a comparison of FIGS. 8A and 9B against FIGS. 9A and 9B, can also show that some entry pages have a higher propensity to drive the target user activity when they are visited via the first digital channel than when they are visited via the second digital channel. For instance, the example website propensity data 118 indicates that entry pages 802B have a higher propensity to drive the target user activity when they are visited via the first digital channel than when they are visited via the second digital channel. In some situations, this may indicate that budgetary and/or development resources should be allocated to increasing the number of user visits to entry pages 802B via the first digital channel, and/or that fewer resources should be allocated to the second digital channel.

Figure 11:
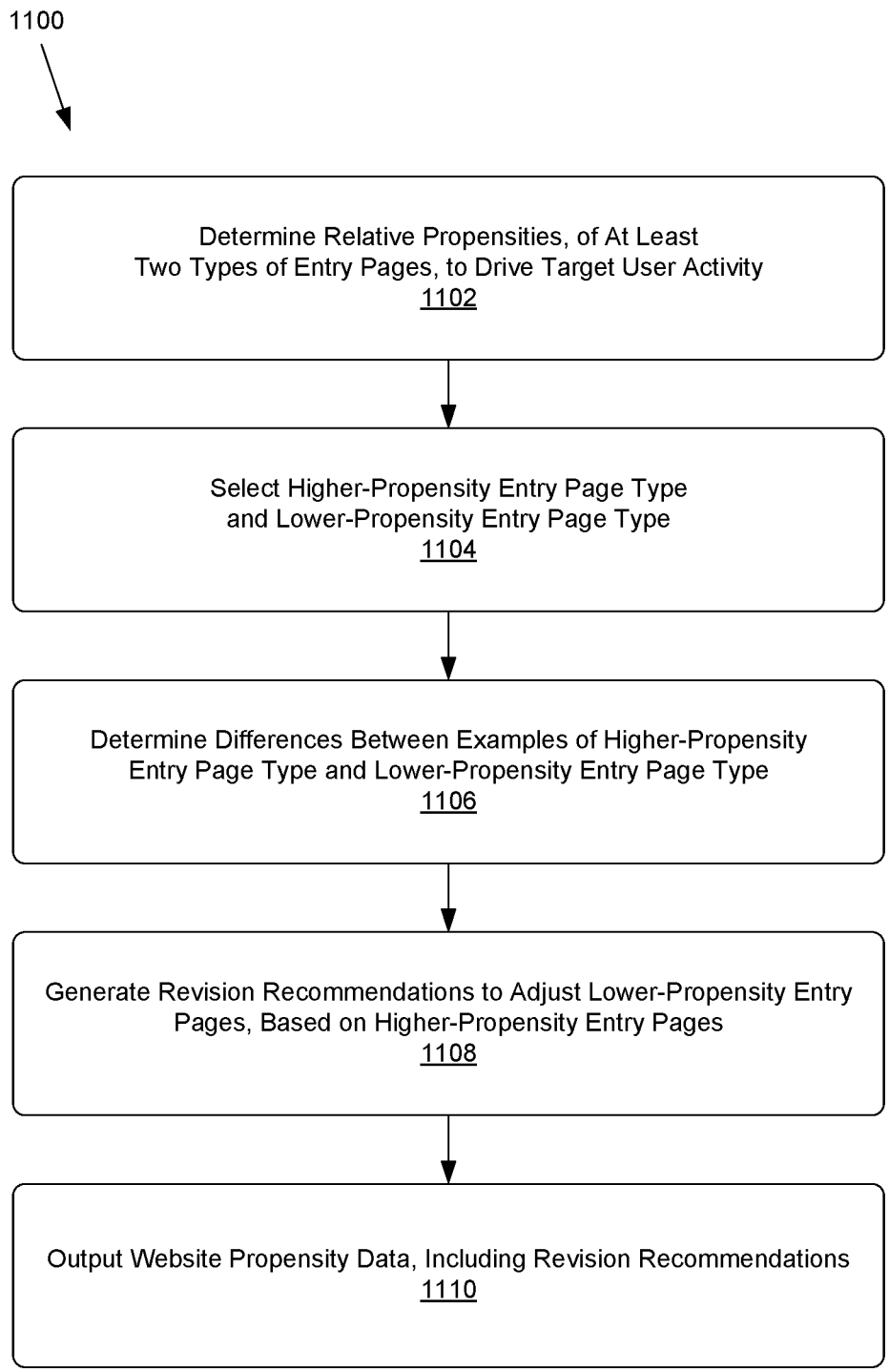
FIG. 11 shows a flowchart of an example method for generating revision recommendations for one or more web pages based on determined propensities to drive a target user activity on a website.

FIG. 11 shows a flowchart of an example method 1100 for generating revision recommendations for one or more web pages 106 based on determined propensities to drive a target user activity on a website 104.

At block 1102, the propensity analyzer 114 can determine relative propensities of at least two types of entry pages to drive the target user activity. For example, the propensity analyzer 114 can use the methods described above, with respect to FIG. 6 and/or FIG. 7, to determine relative propensities of types of entry pages to drive the target user activity. In some examples, the propensity analyzer 114 can determine the relative propensities of the least two types of entry pages to drive the target user activity based on website activity data 116 associated with the same digital channel. In other examples, the propensity analyzer 114 can determine the relative propensities of the least two types of entry pages to drive the target user activity based on website activity data 116 associated with different types of digital channels.

At block 1104, the propensity analyzer 114 can select a higher-propensity entry page type and a lower-propensity entry page type. The higher-propensity entry page type can be a type of entry page that was determined, at block 1102, to have a higher propensity to drive the target user activity than the lower-propensity entry page type. In some examples, the higher-propensity entry page type can be the type of entry page with the highest propensity determined at block 1102. However, in other examples, the higher-propensity entry page type can be any other type of entry page with a higher propensity to drive the target user activity than the selected lower-propensity entry page type.

At block 1106, the propensity analyzer 114 can determine differences between examples of the selected higher-propensity entry page type and the selected lower-propensity entry page type. For example, the propensity analyzer 114 can compare one or more examples of the higher-propensity entry page type and the selected lower-propensity entry page type to identify differences in content, format, design, placement, and/or other attributes of the web pages 106 that may impact the relative propensities of CTAs 112 on the web pages 106 to drive users to engage in the target user activity.

For example, the propensity analyzer 114 may identify differences in design, content, and/or other attributes of CTAs 112 on the web pages 106 that are driving the target user activity, such as differences in messaging content displayed on the web pages 106, locations and sizes of content of CTAs 112 on the web pages 106, navigation options present on the web pages 106, load times of the web pages, the presence or lack of images on the web pages 106, whether the web pages 106 are optimized for display on mobile devices, and/or any other attributes. In some examples, the propensity analyzer 114 may use website analytics and/or replay functionality to replay navigation movements of users through the website 104 to help understand how users progressed from arriving at an entry page to performing or not performing the target user activity.

At block 1108, the propensity analyzer 114 can generate revision recommendations to adjust lower-propensity entry pages based on differences with the higher-propensity entry pages. Such revision recommendations can be included in website propensity data 118 output by the propensity analyzer 114 at block 1110. For example, if the propensity analyzer 114 identifies differences between content and/or design elements of higher-propensity entry pages and lower-propensity web pages, the propensity analyzer 114 can generate recommendations to revise the lower-propensity web pages based on the content and/or design elements of higher-propensity entry pages. This can include a revision recommendation to adjust CTAs 112 of the lower-propensity web pages to be positioned at a location of CTAs 112 on the higher-propensity entry pages, to include key words or other content of CTAs 112 on the higher-propensity entry pages, to be formatted with colors, fonts, font sizes, and/or other design elements of CTAs 112 on the higher-propensity entry pages, and/or other suggestions.

As a non-limiting example, the propensity analyzer 114 may determine that life pages 308 have a higher propensity to drive quote starts on the example website 300 than fire pages 304. The propensity analyzer 114 may also determine at block 1106 that the life pages 308 use CTAs 112 that include the term "free insurance quote," while the fire pages 304 instead use the term "insurance quote" without indicating that such a quote would be provided for free by the website 300. The propensity analyzer 114 may accordingly determine or predict that the additional word "free" may be helping to drive users to start quotes, and generate a recommendation to revise CTAs 112 on the fire pages 304 to include the word "free," or otherwise emphasize that quotes are free. Digital channels 200 can similarly be revised based on such an analysis, such as by revising SEM advertisements with paid links to fire pages 304 to emphasize "free" quotes.

In some examples, the propensity analyzer 114 can use machine learning or other forms of artificial intelligence to automatically identify or predict which elements of higher-propensity entry pages are driving the target user activity, and/or to generate corresponding revision recommendations for lower-propensity entry pages that are predicted to increase the propensities of such entry pages to drive the target user activity. For example, the propensity analyzer 114 can identify a content or design element on a higher-propensity entry page as a candidate element that may be driving the target user activity. In these examples, experiments can be performed in which lower-propensity entry pages are revised to include that content or design element, such that the propensity analyzer 114 can determine if the revisions improve the propensities of the revised web pages to drive the target user activity. Over time, machine learning techniques can determine correlations of such design and/or content changes, to changes in the propensities of the entry pages to drive the target user activity. Accordingly, types of changes identified by such machine learning techniques as being predictive of increases in propensities to drive the target user activity can be applied to other web pages.

In some examples, such machine learning or other artificial intelligence can automatically revise lower-propensity entry pages. In other examples, machine learning or other artificial intelligence may make revision recommendations that are predicted to improve the propensity of certain groups of web pages to drive the target user activity, and human web page designers can then choose to accept or implement the revision recommendations by revising the web pages according to the revision recommendations. In still other examples, machine learning or other artificial intelligence may automatically generate revised drafts of web pages based on revision recommendations predicted to increase their propensities to drive the target user activity, and human reviewers can review and/or approve the automatically-generated revised drafts for use in the website 104. In yet other examples, revisions and/or experimentation can be manually performed based on the revision recommendations included in website propensity data 118 output by the propensity analyzer 114.

As discussed above, the propensity analyzer 114 can determine relative propensities associated with different types of entry pages by normalizing the data to a common number of visits per type of entry page. Accordingly, the types of entry pages that are effective at driving the target user activity can be identified regardless of the amount of traffic that actually arrives via those entry pages. For instance, the propensity analyzer 114 may determine that life pages 308 have a higher propensity to drive quote starts than fire pages 304. However, the life pages 308 may receive relatively little user traffic relative to the fire pages 304. Nevertheless, the propensity analyzer 114 can generate revision recommendations for revising the higher-traffic fire pages 304 that are predicted to increase propensities of the fire pages 304 to drive quote starts based on content and/or design elements of the lower-traffic, but higher-propensity, life pages 308.

The systems and methods described herein can also be used to make other types of content and/or design changes to lower-propensity web pages 106 and/or digital channels 200, based on content and/or design elements on higher-propensity web pages 106 and/or digital channels 200. For example, for the SEO 208 digital channel, a search engine's algorithms may present organic search results in an order determined by many factors such as content on the web page 106, relationships between words or other content on the web pages 106, how quickly the web page 106 loads, how accessible the web page 106 is on mobile devices, and/or other factors. The propensity analyzer 114 may determine that a certain type of web page 106 has a relatively high propensity to drive the target user activity, in association with the SEO 208 digital channel, because that type of web page 106 arranges relevant content closer together or has fewer images such that the web pages load more quickly than other types of web pages. Accordingly, the propensity analyzer 114 can indicate that such content and/or design aspects of the high propensity web page 106 should be applied to lower-propensity web pages 106, based on a prediction that such changes will increase the propensities of the SEO 208 digital channel to drive users to those web pages 106 and/or increase the propensities of those web pages 106 to drive the target user activity.

Additionally, data sets and statically generated propensity estimates can be tracked and compared over time as changes are made to web pages 106 and/or digital channels. For example, if a first type of change to the content or design or a web page 106 increases the propensity of that web page 106 to drive the target user activity during a subsequent time period relative to a previous time period, while a second type of change has less of an effect on the propensity to drive the target user activity, the propensity analyzer 114 can identify the first type of change as being more effective. Accordingly, in some cases, the propensity analyzer 114 can predict that that first type of change, if applied to other groups of web pages 106, may also improve their propensities to drive the target user activity, and generate recommendations to similarly revise the other groups of web pages 106. As such, over time, different types of optimizations can be compared and contrasted to determine which are most effective at improving propensities to drive the target user activity. In some examples, machine learning or other artificial intelligence can be used to, over time, identify and/or predict types of changes that can increase propensities of web pages 106 to drive the target user activity.

Although some examples described above focus on quote starts as the target user activity, the same or a similar analysis can be performed based on any other target user activity. For example, if the target user activity is bill payments via the website 104, the systems and methods described herein can determine which digital channels 200 have the highest propensities for leading users to pay bills, and/or which groups of entry pages have the highest propensities for leading users to pay bills. Accordingly, based on such an analysis, content and/or design elements of pages and digital channels that have higher propensities for driving users to pay bills can be applied to other pages and digital channels that have lower propensities for driving users to pay bills.

As other examples, if the target user activity is finding or searching for insurance agents, starting an insurance claim, or performing any other desired activity, the systems and methods described herein can determine which digital channels 200 and/or groups of entry pages have the highest propensities for leading users to perform that target user activity. As such, based on this analysis, content and/or design elements of web pages 106 and digital channels that have higher propensities for driving the target user activity can be applied to other web pages 106 and digital channels that have lower propensities for driving the target user activity.

In some examples, the techniques described herein can be used to evaluate entry pages and/or digital channels 200 with respect to a set of different target user activities on a website 104. For example, the systems and methods described herein may indicate that a group of entry pages has a high propensity of driving quote starts, but has a lower propensity of driving users to search for an insurance agent. As another example, the analysis may show that the homepage 302 of the example website 300 has a high likelihood of driving quote starts regardless of which digital channel 200 leads users to the website 300. However, the analysis may also show that the homepage 302 is relatively likely to lead users to search for insurance agents when the users arrived via the SEO 208 digital channel, but is relatively unlikely to lead users to search for insurance agents when the users arrived via the direct load 202 digital channel. This may indicate that the SEO 208 digital channel is a valuable driver of agent searches and thus that investment in the SEO 208 digital channel should continue or increase.

Additionally, although the examples described above are discussed in terms of digital channels 200 that lead users to different entry pages of a website 104, the same or similar processes can be used to determine propensities associated with other types of digital properties. For example, a company may have a website 104 and a mobile application that contains similar information and/or functionality as the website 104. Accordingly, the systems and methods described herein may also be used to determine the propensities of different portions or sections of the mobile application to drive the target user activity within the mobile application.

Moreover, although the examples of the target user activity described above may be desirable activities from the perspective of the owner or operator of the website 104 or other digital property, the systems and methods described herein can also be used to determine propensities of digital channels and/or entry pages to lead to negative and/or non-desirable user behavior. For example, the systems and methods described herein can be used to identify which digital channels and/or entry pages have the highest propensities to be used by customers of a company who leave the company within a threshold period of time after using those digital channels and/or entry pages, relative to customers who remain customers of the company. Accordingly, by identifying digital channels and/or entry pages that have higher propensities of being associated with negative and/or non-desirable user behavior, the content, format, and/or other attributes of those digital channels and/or entry pages can be adjusted based on attributes of other digital channels and/or entry pages that have lower propensities of being associated with the negative and/or non-desirable user behavior.

Figure 12:
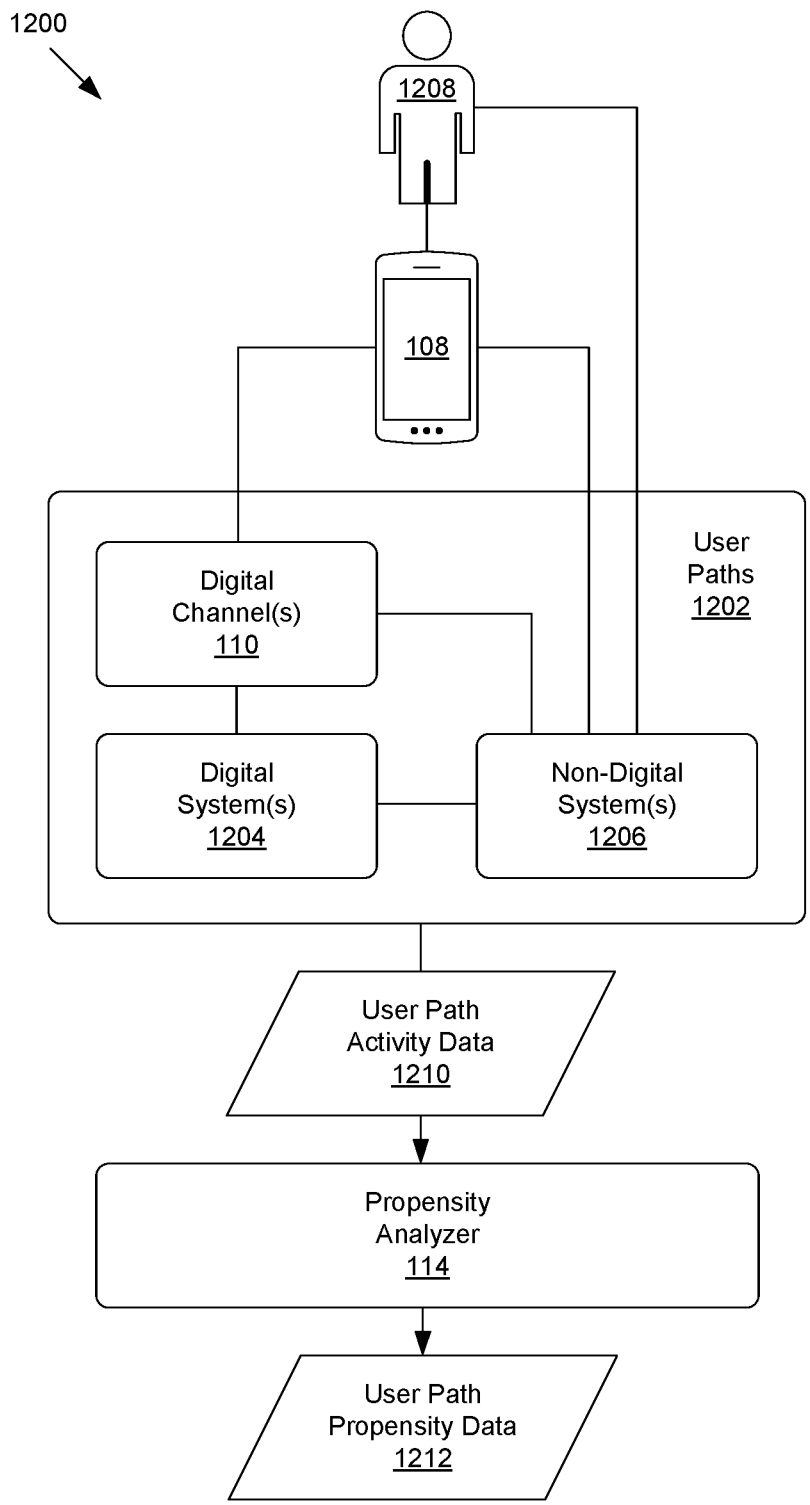
FIG. 12 shows a second example of a propensity analysis system.
Figure 13:
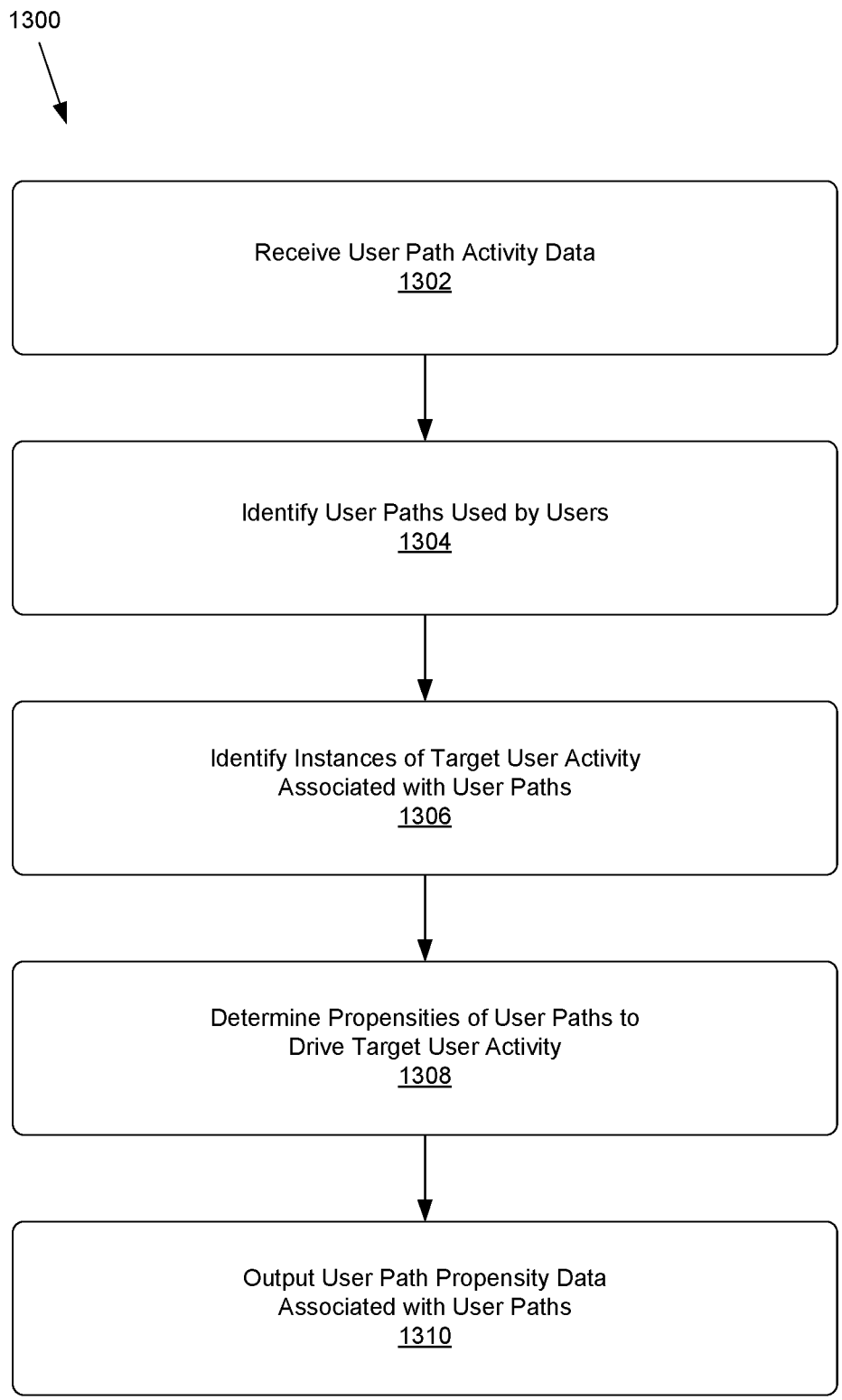
FIG. 13 shows a flowchart of an example method for determining propensities of user paths to drive a target user activity.
Figure 14:
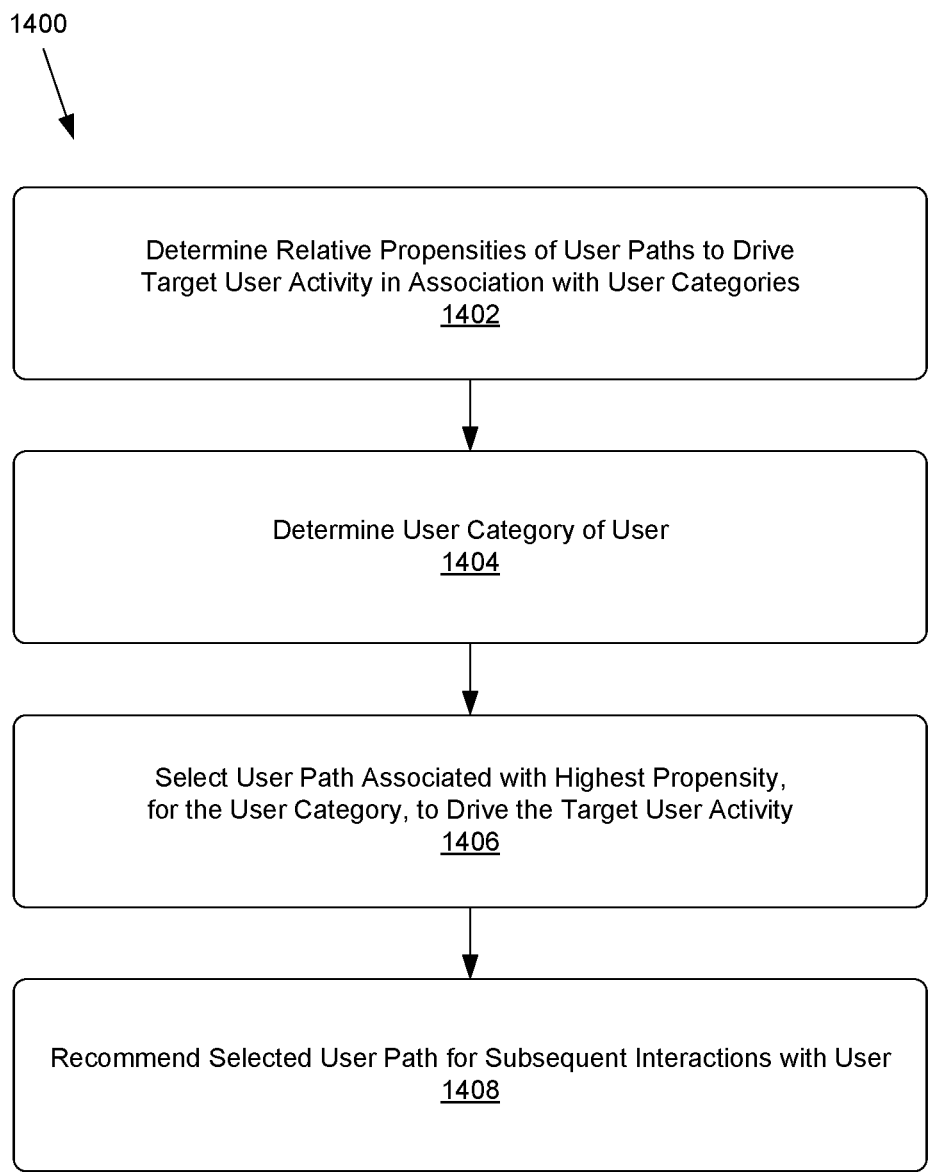
FIG. 14 shows a flowchart of an example method for generating user path recommendations in association with a particular user, based determined propensities of user paths to drive a target user activity.

The examples discussed above can be associated with determining propensities of paths, that users use to arrive at a digital system, to drive a target user activity. For instance, such arrival paths can include digital channels and/or entry pages of a website that users can use to arrive at the website, as discussed above. However, the systems and methods described herein can also be used to determine propensities of other paths, including paths that involve non-digital systems instead of or in addition to digital systems, to drive the target user activity. For example, some users may prefer to initiate a quote start, or engage in another type of target user activity, via a phone call rather than via a website. Accordingly, for some types of users, one or more non-digital systems may have higher propensities to drive the target user activity than the website or other digital systems. FIGS. 12-14 discussed further below, describe examples of propensity analysis with respect to user paths that may include one or more digital channels, one or more digital systems, and/or more non-digital systems.

FIG. 12 shows a second example 1200 of a propensity analysis system. The propensity analysis system can be similar to the propensity analysis system shown in FIG. 1, but may be configured to determine propensities of different user paths 1202, which may include digital channels 110, digital systems 1204, and/or non-digital systems 1206, to drive the target user activity.

The digital systems 1204 and the non-digital systems 1206 can be systems that users, such as user 1208 shown in FIG. 12, can use to engage in a target user activity. As discussed above, the target user activity may be a quote start, or any other type of target user activity. The digital systems 1204 can include the website 104 and mobile application discussed above, as well as any other type of digital system or digital property that is configured to enable users to engage in the target user activity. The non-digital systems 1206 can be other types of systems or interactions by which users can engage in the target user activity, such as offline interactions that may be engaged in outside of the website 104, mobile application, or other digital system. For instance, non-digital systems 1206 can include phone calls, in-person meetings with agents or other representatives, online chats with human representatives, or other types of interactions that the user can use to engage in the target user activity.

Some non-digital systems 1206 may involve some types of digital technologies. For example, a video call or online text chat with a human representative can be executed via computers and/or other digital technologies, but may be considered to be at least partially non-digital due to the personal nature of the interaction between a user and the human representative.

Some user paths 1202 can include one or more of the digital channels 110 discussed above, which may direct or refer users to one or more of the digital systems 1204 and/or non-digital systems 1206. The digital channels 110 can, for instance, be search engine results with links to one or more of the digital systems 1204, and/or that include content directing users to one or more of the non-digital systems 1206.

As an example, if the user paths 1202 are associated with an insurance company, and the user 1208 uses the user device 108 to enter the name of the insurance company into a search engine, the search engine may display paid and/or organic search results. The search results may include links to digital systems 1204, such as a website and/or individual entry pages of the website. For instance, the search results may include links to the homepage 302 of the website 300 for the insurance company, and/or to one or more agent pages 312 of the website 300 that are associated with particular insurance agents, as discussed above with respect to FIG. 3. However, the search engine may also show other paid and/or organic search results that display a phone number for the insurance company or a particular insurance agent. Accordingly, although the user 1208 may have used the search engine to perform a search for the name of the insurance company in this example, the search results presented via the search engine may be digital channels 110 that refer the user 1208 to digital systems 1204 (such as links to web pages 106 of the website 300), and that refer the user 1208 to non-digital systems 1206 (such as the phone numbers for the insurance company and/or an insurance agent).

The user may choose to use one or more of those digital systems 1204 and/or non-digital systems 1206, and may engage in the target user activity via one of the digital systems 1204 and/or non-digital systems 1206. For instance, based on the example search results discussed above, the user 1208 could choose to click on one of the links to visit a corresponding web page of the insurance company's website 300 via the user device 108, and may start a new insurance quote via the website 300 as discussed above. However, the user 1208 may instead choose to call a phone number displayed within the search results to speak to an agent of the insurance company instead of visiting the website 300, and may start a new insurance quote after talking to the agent and requesting the insurance quote.

Although some user paths 1202 can include one or more digital channels 110 as discussed above, other user paths 1202 may not include digital channels 110, for instance if users access non-digital systems 1206 directly. As an example, the user 1208 may call an agent, or walk into the agent's office for an in-person meeting, without having been directed to the agent via one of the digital channels 110. Accordingly, in this example, the user 1208 may follow a user path to a non-digital system that is associated with a personal interaction with the agent, and that user path may not be associated with a digital channel.

Individual user paths 1202 can accordingly involve different combinations of digital channels 110, digital systems 1204, and/or non-digital systems 1206. In some examples, a user path may include a digital system and a non-digital system. As a first example, a first user may initially use a digital system, such as a website, but may not ultimately request an insurance quote or engage in another target user activity via the digital system. However, the first user may later call an agent, or access another non-digital system, and request an insurance quote or engage in another target user activity via the non-digital system. As a second example, a second user may initially speak to an agent to learn more about insurance options, but then visit the website 300 to actually request and view an insurance quote instead of requesting the insurance quote offline via the agent.

Similar to different digital channels 110 and/or entry pages associated with an individual digital system, such as the website 104, having different propensities to drive the target user activity as discussed above, different user paths 1202 that may be associated with different digital channels 110, different digital systems 1204, and/or different non-digital systems 1206 may also have different propensities to drive the target user activity. As shown in FIG. 12, the propensity analyzer 114 can receive user path activity data 1210 that indicates how the user 1208 and other users have used user paths 1202 over time, including whether such users engaged in the target user activity via one or more of the user paths 1202. The propensity analyzer 114 can, based on the user path activity data 1210, determine relative propensities of the different user paths 1202 to drive the target user activity.

The user path activity data 1210 can include the website activity data 116 discussed above, which can indicate how users interacted with a website and whether the users engaged in instances of the target user activity via the website. The user path activity data 1210 can include similar data indicating how users interacted with other types of digital systems 1204 and/or non-digital systems 1206, and whether the users engaged in instances of the target user activity via the digital systems 1204 and/or non-digital systems 1206. The user path activity data 1210 can also indicate whether, and/or which, digital channels 110 lead users to the digital systems 1204 and/or non-digital systems 1206. As an example, user path activity data 1210 associated with a particular agent can be based on notes or other information provided by the agent with respect to individual users, such as notes indicating identities or other attributes of the users, whether the agent helped the users get insurance quotes or engage in other target user activities, whether the users indicated that they were referred to the agent via digital channels 110 or digital systems 1204, identifies of the digital channels 110 or digital systems 1204 that referred the users to the agent, and/or other types of information.

The propensity analyzer 114 can perform statistical analyses, such as analyses based on regression, linear regression, decision tree modeling, and/or other statistical analysis techniques, to determine propensities associated with different user paths 1202 to drive users to engage in the target user activity. For example, the propensity analyzer 114 can use a logistic regression model to identify variables that lead to responses, as described above. The propensity analyzer 114 can accordingly identify and/or estimate the contributions of individual variables, such as individual digital channels 110, digital systems 1204, and/or non-digital systems 1206, toward users performing, or not performing, the target user activity in association with different user paths 1202. Additionally, as discussed above, in some examples the propensity analyzer 114 can use one or more selection techniques to determine which variables, from a set of variables, are not contributing to the target user activity, and omit those variables from consideration within the model used by the propensity analyzer 114.

The propensity analyzer 114 can accordingly generate and/or output user path propensity data 1212 that indicates determined propensities associated with entire user paths 1202, and/or digital channels 110, digital systems 1204, and/or non-digital systems 1206 associated with user paths 1202. The user path propensity data 1212 can be similar to the website propensity data 118 discussed above.

The user path propensity data 1212 generated by the propensity analyzer 114 may be used to prioritize resources associated with the user paths 1202. For instance, if the user path propensity data 1212 indicates that one user path is more likely than another user path to lead to instances of a target user activity, an operator associated with the user paths 1202 may choose to allocate higher budgets to, and/or assign more developers to work on, the user path with the higher propensity to drive users to engage in the target user activity. Alternatively, or in addition, the operator may use the user path propensity data 1212 to identify lower-propensity user paths 1202, and allocate resources to improve the propensities of the lower-propensity user paths 1202 to drive users to engage in the target user activity.

In some examples, the user path propensity data 1212 generated by the propensity analyzer 114 can include recommendations for revising one or more digital channels 110, digital systems 1204, and/or non-digital systems 1206 associated with one or more user paths 1202, based on relative differences between determined propensities associated with different user paths 1202. For instance, if the user path propensity data 1212 indicates that a first group of users who followed a first user path were more likely to engage in a target user activity than a second group of users who followed a second user path, attributes of the second user path can be revised based on aspects of the first user path with the higher propensity to drive the target user activity.

As a first example, if the user path propensity data 1212 indicates that users are more likely to engage in a target user activity via a type of non-digital system, such as a phone call with an agent, than via the website 104, the user path propensity data 1212 may recommend revising one or more digital channels 110, such as display advertisements 204, email advertisements 206, SEM 210, and/or other digital channels 110, to include content that presents phone numbers of agents instead of, or in addition to, links to the website 104. In this example, the user path propensity data 1212 may also, or alternately, recommend revising the content of one or more web pages 106 of the website 104 to include the agent phone numbers and/or messages recommending that, or instructing, the user to call the agent phone numbers.

As a second example, the user path propensity data 1212 may instead indicate that users are more likely to engage in a target user activity via a type of digital system, such as the website 104, than via a non-digital system such as a phone call with an agent. Accordingly, the user path propensity data 1212 may recommend implementing a program wherein if an agent has been speaking to a user, but the user has not engaged in a target user activity via the agent, the agent send follow-up email advertisements 206 to the user that include links to the website 104. Accordingly, the user may be more likely to follow a website link in a follow-up email and engage in the target user activity via the website, relative to the likelihood of the user engaging in the target user activity during follow-up calls with the agent.

In some examples, such revision recommendations, or draft revisions, may be generated using the machine learning and/or artificial intelligence techniques discussed above. Additionally, similar to revisions discussed above, designers can choose to accept or implement such automatically-generated revision recommendations by revising the digital channels 110, digital systems 1204 and/or non-digital systems 1206, or by reviewing and/or approving automatically-generated revisions to the digital channels 110, digital systems 1204 and/or non-digital systems 1206.

In some examples, the user path propensity data 1212 may recommend certain user paths 1202 to be used with respect to certain categories of users. For example, the user path activity data 1210 may be associated with, or correlated with, cookie data, user profile data, and/or other types of data that may indicate ages, genders, locations, customer histories, web browsing histories, and/or other information associated with users. The propensity analyzer 114 may use such user path activity data 1210 to determine relative propensities of different user paths 1202 to drive instances of a target user activity in association with different categories of users. Accordingly, the user path propensity data 1212 generated by the propensity analyzer 114 based on such user path activity data 1210 can indicate which user paths 1202 have higher propensities to drive the target user activity with respect to users in particular user categories.

As an example, the user path propensity data 1212 may indicate that users who are younger than a threshold age may be most likely to engage in a target user activity via a website, while other users who are older than the threshold age may be most likely to engage in the target user activity via a call with an agent. Accordingly, if an age of a first user, such as a prospective customer can be determined or estimated from cookie data based on a previously-stored user profile, based on preliminary contact information provided by the first user, based on web browsing history, and/or based on any other information, indicates that the first user is younger than the threshold age and may thus be more likely to engage in the target user activity via the website than via an agent call, search results and/or web pages of the website can be provided or recommended to the first user that highlight options to engage in the target user activity via the website. However, if the age of a second user is similarly determined or estimated to be older than the threshold age, such that the second user may thus be more likely to engage in the target user activity via an agent call than via the website, search results and/or web pages of the website can be provided or recommended to the second user that highlight phone numbers for calling agents. Accordingly, in this example, different search results may be displayed to the two users, and/or if both users access the website 104, the server 102 may provide first web pages 106 to the first user that highlight online options for engaging in the target user activity, but provide second web pages 106 to the second user that highlight agent phone numbers instead of or in addition to the online options for engaging in the target user activity.

FIG. 13 shows a flowchart of an example method 1300 for determining propensities of user paths 1202 to drive a target user activity. At block 1302, the propensity analyzer 114 can receive user path activity data 1210. The user path activity data 1210 may indicate which user paths 1202 have been used by users, including which digital channels 110, digital systems 1204, and/or non-digital systems 1206 have been used by users, and whether the users engaged in the target user activity via the corresponding user paths 1202.

At block 1304, the propensity analyzer 114 can use the user path activity data 1210 to identify which user paths 1202 were used by users over a period of time. As discussed above, different users may use different user paths 1202, such as user paths 1202 associated with different combinations of digital channels 110, digital system 1204, and/or non-digital systems 1206. The propensity analyzer 114 can be configured to determine, from referring page identifiers, cookie data, agent notes, and/or other information in the user path activity data 1210, which user paths 1202 have been used by users, and/or how often such user paths 1202 have been used by users. At block 1306, the propensity analyzer 114 can also use the user path activity data 1210 to identify instances of the target user activity that occurred in association with the user paths 1202 identified at block 1304.

At block 1308, the propensity analyzer 114 can perform a statistical analysis on the data identified during block 1304 and block 1306 to generate estimates of the propensities of individual user paths 1202, and/or individual digital channels 110, digital system 1204, and/or non-digital systems 1206 associated with the individual user paths 1202, to drive the target user activity. In some examples, the data captured and tracked during blocks 1302 through 1306 can be stored in a database or other repository over a period of time, such as a day, a week, a month, or any other time period, and a set of data collected over the time period can later be analyzed at block 1308.

As discussed above, the statistical analysis can be based on regression, linear regression, decision tree modeling, and/or other statistical analysis techniques. As a non-limiting example, the statistical analysis performed during block 1308 can be based on a logistic regression model that uses different user paths 1202 and/or corresponding digital channels 110, digital system 1204, and/or non-digital systems 1206 as variables, and identifies contributions of different variables to a response associated with the target user activity occurring. Accordingly, the statistically determined estimates of contribution values produced during block 1308 can indicate individual and/or relative propensities of different user paths 1202 and/or corresponding digital channels 110, digital system 1204, and/or non-digital systems 1206 to drive users to perform the target user activity.

In some examples, the statistical analysis performed during block 1308 can use a logistic regression model, such as a linear logistic model, that identifies variables that lead to responses. This model can be the same or a similar model described above with respect to FIG. 1, such as a logistic regression model that uses forward selection, backward elimination, or stepwise selection. The variables considered by the logistic regression model can include variables associated with the user paths 1202, such as identifiers of entire user paths 1202 and/or identifiers of digital channels 110, digital system 1204, and/or non-digital systems 1206 associated with entire user paths 1202. Overall, at block 1308, the statistical analysis can identify or estimate the contributions of individual variables, such as individual types of digital channels 110, digital system 1204, and/or non-digital systems 1206 associated with user paths 1202, toward users performing or not performing the target user activity. Accordingly, the statistically determined estimates of contribution values produced during block 1308 can indicate which user paths 1202, or elements of such user paths 1202, are most likely to drive users to perform the target user activity.

At block 1310, the propensity analyzer 114 can output user path propensity data 1212 associated with the user paths 1202. For example, the user path propensity data 1212 can identify at least some of the individual and/or relative propensities of different user paths 1202 and/or components of the user paths 1202, determined at block 1308, to drive users to perform the target user activity. In some examples, the user path propensity data 1212 output at block 1310 may include recommendations for revising one or more aspects of a first user path based on attributes of one or more other higher-propensity user paths 1202, which may be predicted to increase the propensity of the first user path to drive users to engage in the target user activity.

Overall, the process of FIG. 13 can determine relative propensities of different user paths 1202, and/or digital channels 110, digital system 1204, and/or non-digital systems 1206 associated with the user paths 1202, to drive the target user activity. In some examples, the user path activity data 1210 received at block 1302 may indicate user profile data, cookie data, and/or other information indicating activities of one or more categories of users, such as users in different age groups, different locations, and/or other types of categories. Accordingly, in some examples, the propensity analyzer 114 may identify user path activity data 1210 associated with one or more categories of users, and separately analyze the user path activity data 1210 associated with different categories of users during the process of FIG. 4. Accordingly, the user path propensity data 1212 output at block 1310 may indicate that different categories of users may have different propensities to engage in the target user activity via the same user path, and/or may indicate relative propensities of different user paths 1202 in association with different categories of users.

FIG. 14 shows a flowchart of an example method 1400 for generating user path recommendations in association with a particular user, based determined propensities of user paths 1202 to drive a target user activity. At block 1402, the propensity analyzer 114 can determine relative propensities of at least two user paths 1202 to drive the target user activity, in association with different user categories. For example, the propensity analyzer 114 can use the method described above with respect to FIG. 13 to determine relative propensities of user paths 1202 to drive the target user activity, in association with different user categories such as age categories, gender categories, location categories, and/or other categories.

At block 1404, the propensity analyzer 114 can determine a user category associated with a particular user. The particular user can, in some examples, be a prospective customer of a company associated with the user paths 1202. The propensity analyzer 114 can use cookie data indicative of web browsing history, user profile data, information about the user provided by one or more digital systems 1204 and/or non-digital systems 1206, and/or any other information to classify the particular user into one of the user categories, for instance by determining or estimating attributes of the user and identifying one of the user categories that corresponds to the attributes of the user.

At block 1406, the propensity analyzer 114 can select one of the user paths 1202 that corresponds to user path with the highest propensity, determined at block 1402, to drive the target user activity in association with the user category determined at block 1404. For example, if the propensity analyzer 114 determined or estimated the age of the particular user, and the age of the particular use is associated with a particular user category, the propensity analyzer 114 can select the user path that has the highest propensity, among users of that particular user category, to lead to instances of the target user activity.

At block 1408, the propensity analyzer 114 can recommend the user path, selected at block 1406, for subsequent interactions with the particular user. For example, if the user has arrived at the website 104, but the user path recommended by the propensity analyzer 114 includes a non-digital system, such as a phone call with an agent, the propensity analyzer 114 can cause the server 102 to serve a first web page of the website 104 that recommends that the user call a displayed phone number for the agent, such that the agent can assist the user with engaging in the target user activity via a phone call. However, if the user path recommended by the propensity analyzer 114 instead includes the website, the propensity analyzer 114 can cause the server 102 to serve a second web page of the website 104 that includes online options for the user to engage in the target user activity.

Figure 15:
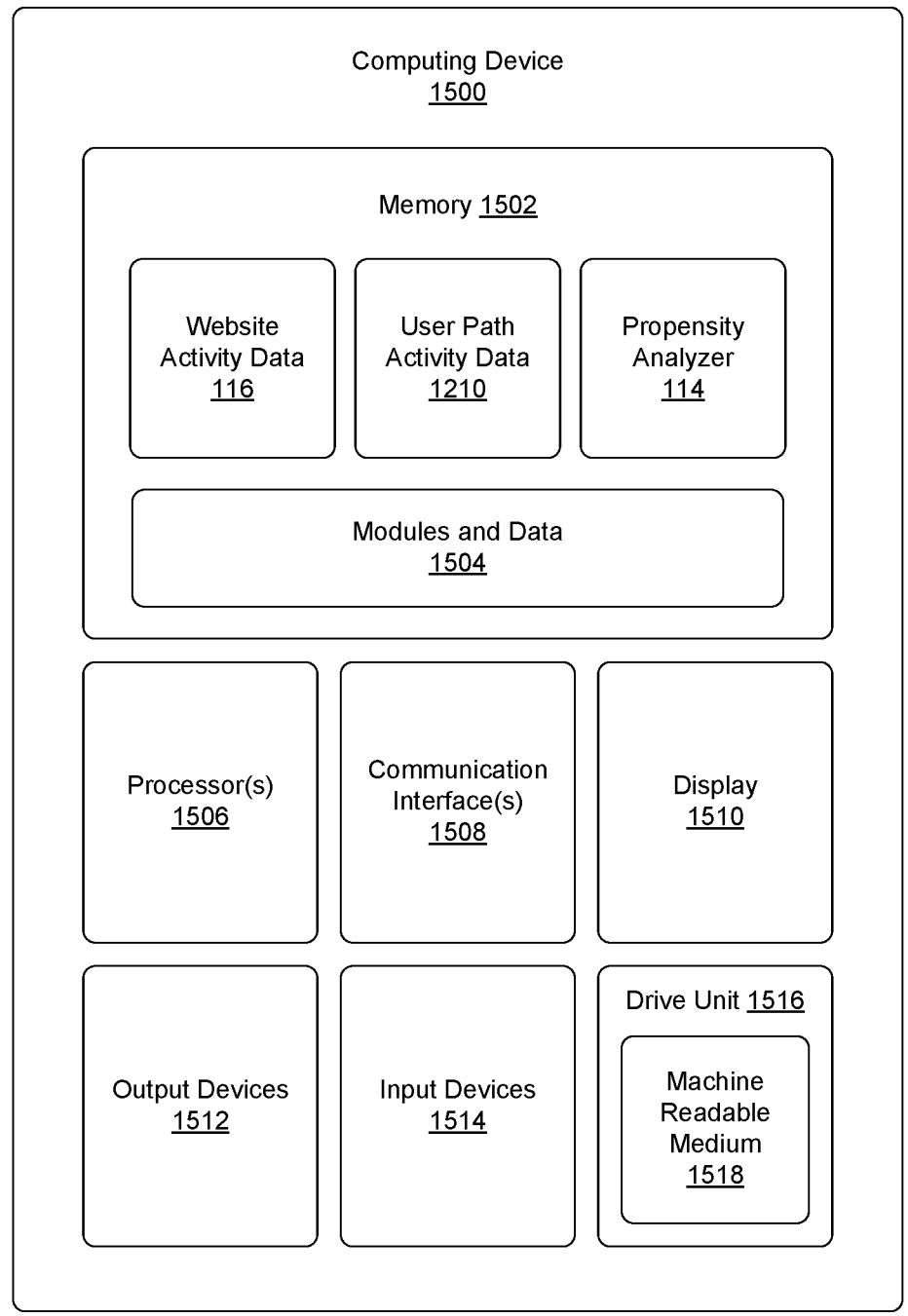
FIG. 15 shows an example system architecture for a computing device.

FIG. 15 depicts an example system architecture for a computing device 1500 in accordance with various examples. The computing device 1500 can include one or more servers, computers, or other computing elements. In some examples, the computing device 1500 can be the server 102 that hosts the website 104. However, in other examples, the computing device 1500 can be one or more separate computing devices that receive the website activity data 116 associated with the website 104. In still other examples, the computing device 1500 can be one or more computing devices associated with one or more elements of user paths 1202, such as user paths 1202 associated with combinations of digital channels 110, digital systems 1204, and/or non-digital systems 1206, and/or that can receive corresponding user path activity data 1210.

As shown, the computing device 1500 can have memory 1502 storing the website activity data 116, the user path activity data 1210, the propensity analyzer 114, and/or other modules and data 1504. The propensity analyzer 114 can be configured to perform the statistical analysis, machine learning, and/or other computations described above to, based on the website activity data 116, determine propensities of digital channels and/or web pages 106 to drive users to perform a target user activity during visits to the website 104. The propensity analyzer 114 can also, or alternately, be configured to perform the statistical analysis, machine learning, and/or other computations described above to, based on the user path activity data 1210, determine propensities of user paths 1202 to drive users to perform the target user activity. The other modules and data 1504 can be utilized by the computing device 1500 to perform or enable performing any action taken by the computing device 1500. The modules and data 1504 can include a platform, operating system, and applications, and data utilized by the platform, operating system, and applications. The computing device 1500 can also have processor(s) 1506, communication interfaces 1508, a display 1510, output devices 1512, input devices 1514, and/or a drive unit 1516 including a machine readable medium 1518.

In some examples, elements of the computing device 1500 shown in FIG. 15 can be distributed among multiple computing devices 1500. For example, a first computing device 1500 can be a web server that stores data associated with the web pages 106 for the website 104 and/or the website activity data 116, while a second computing device 1500 is a separate server, workstation, laptop computer, or other computing device that executes the propensity analyzer 114.

In various examples, the memory 1502 can include system memory, which may be volatile (such as RAM), non-volatile (such as ROM, flash memory, etc.) or some combination of the two. The memory 1502 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the computing device 1500. Any such non-transitory computer-readable media may be part of the computing device 1500.

In various examples, the processor(s) 1506 can be a central processing unit (CPU), a graphics processing unit (GPU), or both CPU and GPU, or any other type of processing unit. Each of the one or more processor(s) 1506 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 1506 may also be responsible for executing all computer applications stored in the memory 1502, which can be associated with common types of volatile (RAM) and/or nonvolatile (ROM) memory.

The communication interfaces 1508 can include transceivers, modems, interfaces, antennas, and/or other components that can transmit and/or receive data over networks or other data connections.

The display 1510 can be a liquid crystal display or any other type of display commonly used in computing devices 1500. For example, a display 1510 may be a touch-sensitive display screen, and can then also act as an input device or keypad, such as for providing a soft-key keyboard, navigation buttons, or any other type of input. The output devices 1512 can include any sort of output devices known in the art, such as a display 1510, speakers, a vibrating mechanism, and/or a tactile feedback mechanism. Output devices 1512 can also include ports for one or more peripheral devices, such as headphones, peripheral speakers, and/or a peripheral display. The input devices 1514 can include any sort of input devices known in the art. For example, input devices 1514 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 1518 can store one or more sets of instructions, such as software or firmware, that embodies any one or more of the methodologies or functions described herein. The instructions can also reside, completely or at least partially, within the memory 1502, processor(s) 1506, and/or communication interface(s) 1508 during execution thereof by the computing device 1500. The memory 1502 and the processor(s) 1506 also can constitute machine readable media 1518.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
receiving, by a processor, activity data indicating use of a set of user paths by users, wherein individual user paths, of the set of user paths, comprise at least one of a digital channel, a digital system, or a non-digital system;
identifying, by the processor, and based on the activity data, instances of a particular user activity occurring in association with the individual user paths;
determining, by the processor, and based on the instances of the particular user activity, respective propensities of the individual user paths to drive the particular user activity;
determining, by the processor, and based on the respective propensities, that a first propensity of a first user path to drive the particular user activity is different than a second propensity of a second user path to drive the particular user activity; and
revising, by the processor, and based on determining that the first propensity is different than the second propensity, the first user path based on an attribute of the second user path.

2. The method of claim 1, wherein:
the particular user activity is a desired target user activity,
the first propensity of the first user path to drive the particular user activity is lower than the second propensity of the second user path to drive the particular user activity, and
revising the first user path based on the attribute of the second user path increases the first propensity of the first user path to drive the particular user activity.

3. The method of claim 2, wherein the desired target user activity comprises an initiation of a new insurance quote.

4. The method of claim 1, wherein:
the particular user activity is an undesired user activity,
the first propensity of the first user path to drive the particular user activity is higher than the second propensity of the second user path to drive the particular user activity, and
revising the first user path based on the attribute of the second user path decreases the first propensity of the first user path to drive the particular user activity.

5. The method of claim 4, wherein:
the set of user paths is associated with a company,
the users are existing customers of the company, and
the undesired user activity comprises a user leaving the company within a threshold period of time following the user using an individual user path of the set of user paths.

6. The method of claim 1, wherein the digital system of at least one of the individual user paths comprises at least one of a website or a mobile application.

7. The method of claim 1, wherein the non-digital system of at least one of the individual user paths comprise at least one of phone calls or in-person meetings.

8. The method of claim 1, wherein determining the respective propensities comprises determining, by the processor, and using a logistic regression model, relative contributions of the individual user paths to drive the particular user activity.

9. The method of claim 8, wherein determining the respective propensities further comprises determining, by the processor, and using the logistic regression model, the relative contributions of the digital channel, the digital system, or the non-digital system, associated with the individual user paths, to drive the particular user activity.

10. The method of claim 1, wherein:
the activity data indicates user classifications of the users,
the processor identifies the instances of the particular user activity occurring in association with the individual user paths and individual user classifications, of the user classifications, and
the processor determines the respective propensities of the individual user paths to drive the particular user activity in association with the individual user classifications.

11. A computing system, comprising:
a processor; and
memory storing computer-executable instructions that, when executed by the processor, cause the processor to:
receive activity data indicating use of a set of user paths by users, wherein individual user paths, of the set of user paths, comprise at least one of a digital channel, a digital system, or a non-digital system;
identify, based on the activity data, instances of a particular user activity occurring in association with the individual user paths;
determine, based on the instances of the particular user activity, respective propensities of the individual user paths to drive the particular user activity;
determine, based on the respective propensities, that a first propensity of a first user path to drive the particular user activity is different than a second propensity of a second user path to drive the particular user activity; and
revise, based on determining that the first propensity is different than the second propensity, the first user path based on an attribute of the second user path.

12. The computing system of claim 11, wherein:
the particular user activity is a desired target user activity,
the first propensity of the first user path to drive the particular user activity is lower than the second propensity of the second user path to drive the particular user activity, and
revising the first user path based on the attribute of the second user path increases the first propensity of the first user path to drive the particular user activity.

13. The computing system of claim 11, wherein:
the particular user activity is an undesired user activity,
the first propensity of the first user path to drive the particular user activity is higher than the second propensity of the second user path to drive the particular user activity, and
revising the first user path based on the attribute of the second user path decreases the first propensity of the first user path to drive the particular user activity.

14. The computing system of claim 13, wherein:
the set of user paths is associated with a company,
the users are existing customers of the company, and
the undesired user activity comprises a user leaving the company within a threshold period of time following the user using an individual user path of the set of user paths.

15. One or more non-transitory computer-readable media storing computer-executable instructions that, when executed by a processor, cause the processor to perform operations comprising:
receiving activity data indicating use of a set of user paths by users, wherein individual user paths, of the set of user paths, comprise at least one of a digital channel, a digital system, or a non-digital system;
identifying, based on the activity data, instances of a particular user activity occurring in association with the individual user paths;
determining, based on the instances of the particular user activity, respective propensities of the individual user paths to drive the particular user activity;
determining, based on the respective propensities, that a first propensity of a first user path to drive the particular user activity is different than a second propensity of a second user path to drive the particular user activity; and
revising, based on determining that the first propensity is different than the second propensity, the first user path based on an attribute of the second user path.

16. The one or more non-transitory computer-readable media of claim 15, wherein:
the particular user activity is a desired target user activity,
the first propensity of the first user path to drive the particular user activity is lower than the second propensity of the second user path to drive the particular user activity, and
revising the first user path based on the attribute of the second user path increases the first propensity of the first user path to drive the particular user activity.

17. The one or more non-transitory computer-readable media of claim 15, wherein:
the particular user activity is an undesired user activity,
the first propensity of the first user path to drive the particular user activity is higher than the second propensity of the second user path to drive the particular user activity, and
revising the first user path based on the attribute of the second user path decreases the first propensity of the first user path to drive the particular user activity.

18. The one or more non-transitory computer-readable media of claim 17, wherein:
the set of user paths is associated with a company,
the users are existing customers of the company, and
the undesired user activity comprises a user leaving the company within a threshold period of time following the user using an individual user path of the set of user paths.

19. A system comprising:
means for receiving activity data indicating use of a set of user paths by users, wherein individual user paths, of the set of user paths, comprise at least one of a digital channel, a digital system, or a non-digital system;
means for identifying, based on the activity data, instances of a particular user activity occurring in association with the individual user paths;
means for determining, based on the instances of the particular user activity, respective propensities of the individual user paths to drive the particular user activity;
means for determining, based on the respective propensities, that a first propensity of a first user path to drive the particular user activity is different than a second propensity of a second user path to drive the particular user activity; and means for revising, based on determining that the first propensity is different than the second propensity, the first user path based on an attribute of the second user path.

20. The system of claim 19, wherein:

the particular user activity is an undesired user activity, the first propensity of the first user path to drive the particular user activity is higher than the second propensity of the second user path to drive the particular user activity, and revising the first user path based on the attribute of the second user path decreases the first propensity of the first user path to drive the particular user activity.

* * * * *